(12) United States Patent
Enis et al.

(10) Patent No.: US 10,167,205 B1
(45) Date of Patent: Jan. 1, 2019

(54) EXPLOSIVE SEPARATION OF IMPURITIES FROM WASTE WATER IN FREEZE CRYSTALLIZATION SPRAY CHAMBERS

(71) Applicant: EnisEnerGen, Henderson, NV (US)

(72) Inventors: Ben M. Enis, Henderson, NV (US); Paul Lieberman, Torrance, CA (US)

(73) Assignee: EnisEnerGen, LLC, Henderson, NV (US)

( * ) Notice: Subject to any disclaimer, the term of this patent is extended or adjusted under 35 U.S.C. 154(b) by 0 days.

(21) Appl. No.: 15/887,959

(22) Filed: Feb. 2, 2018

(51) Int. Cl.
C02F 1/22 (2006.01)
F25C 1/12 (2006.01)
B01D 9/00 (2006.01)

(52) U.S. Cl.
CPC ............ *C02F 1/22* (2013.01); *B01D 9/0009* (2013.01); *F25C 1/12* (2013.01); *B01D 9/0059* (2013.01); *C02F 2201/002* (2013.01)

(58) Field of Classification Search
CPC .......... C02F 1/10; C02F 1/22; C02F 2209/02; C02F 2303/26; C02F 2001/5218; C02F 2103/08; C02F 2103/10; B01D 9/0004; B01D 9/0009; B01D 59/08; Y02A 20/132; F25C 1/12
See application file for complete search history.

(56) References Cited

U.S. PATENT DOCUMENTS

2010/0037653 A1* 2/2010 Enis .................. B01D 5/0027
62/532

* cited by examiner

*Primary Examiner* — Pranav N Patel
(74) *Attorney, Agent, or Firm* — MU P.C.

(57) ABSTRACT

A wastewater purification system is provided. The wastewater purification system comprises a chamber. One or more wastewater nozzles are positioned near the top of the chamber. An intake duct is further provided to supply chilled air into the chamber, and one or more exhaust ducts are provided to remove the chilled air from the chamber. One or more perforated receptacles positioned near the bottom of the chamber to collect solid byproducts, and a watertight receptacle at the bottom of the chamber to collect a liquid product. The wastewater enters the chamber as wastewater droplets via the one or more wastewater nozzles, wherein the wastewater undergoes freeze separation due to heat exchange with a high mass flow of the chilled air between the intake duct and the one or more exhaust ducts.

17 Claims, 23 Drawing Sheets

FIG. 1
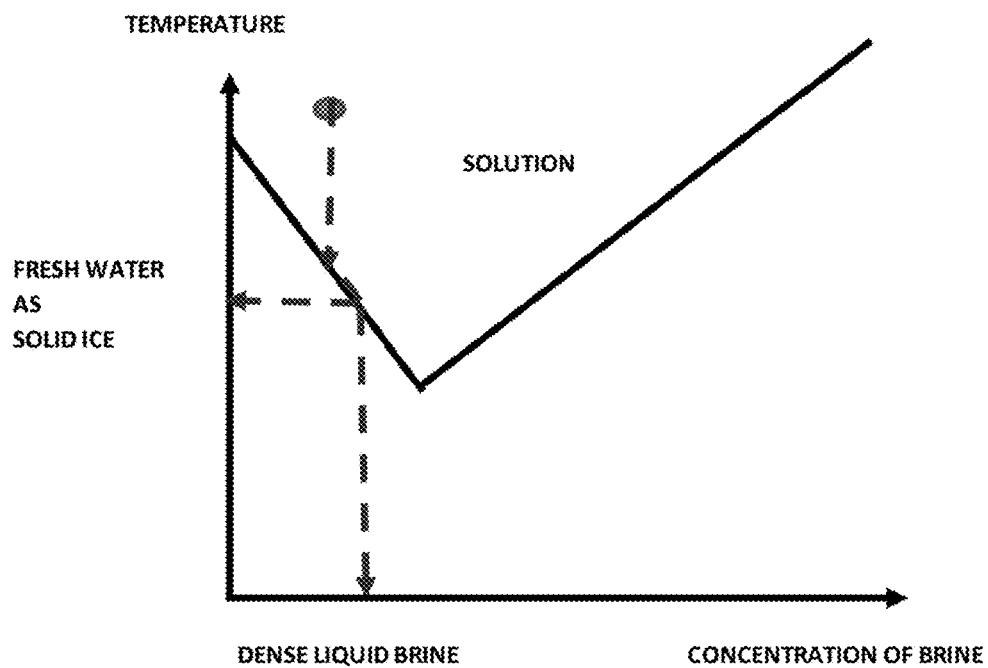
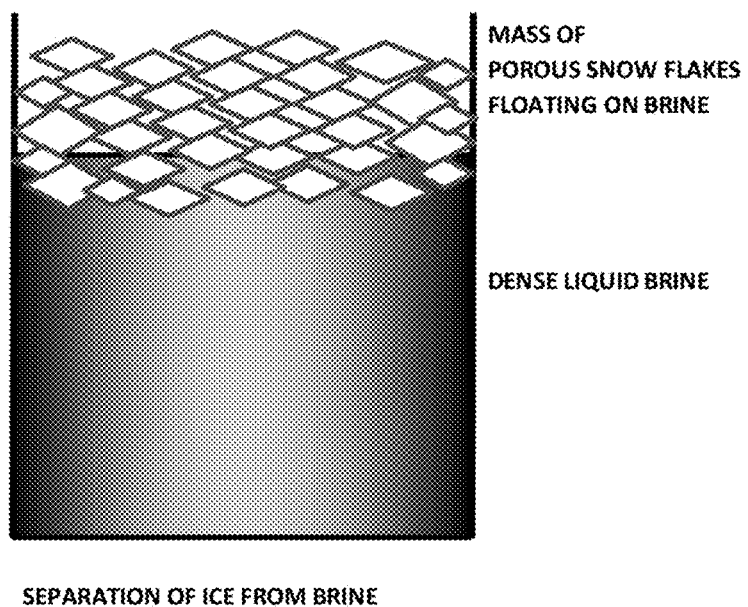
SEPARATION OF ICE FROM BRINE

FIG. 2
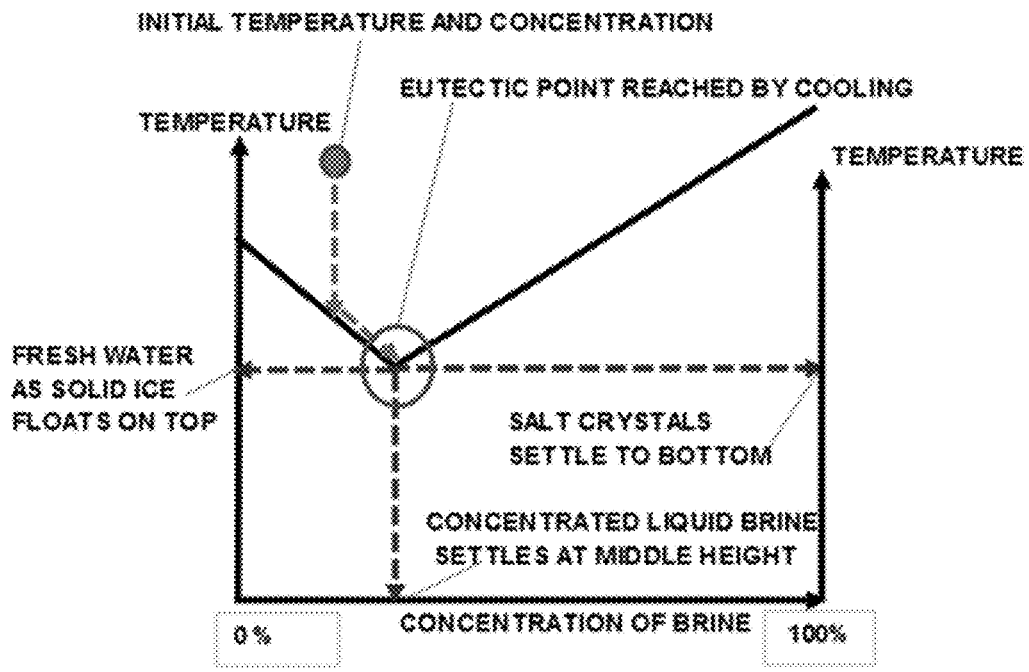
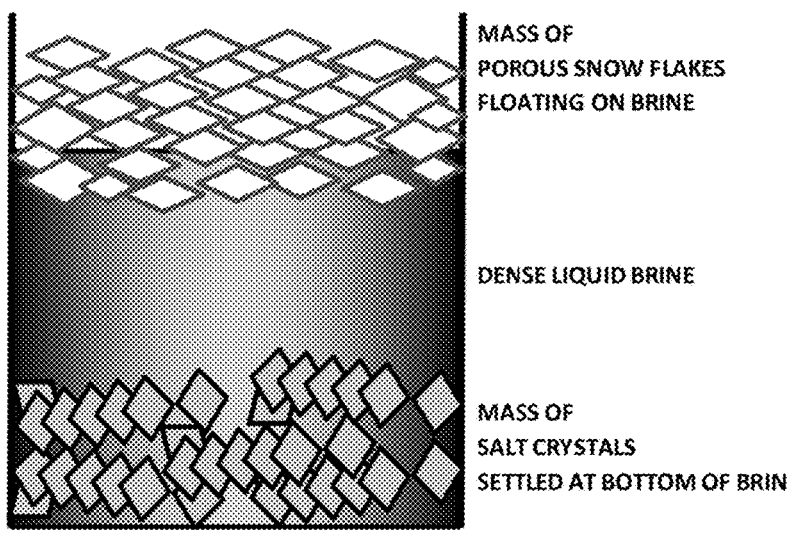
SEPARATION OF SOLUTES FROM SOLVENT
OF THE SOLUTION AT EUTECTIC TEMPERATURE

FIG. 3

| SALT | EUTECTIC POINT | |
|---|---|---|
| | TEMPERATURE (DEG C) | CONCENTRATION WT (%) |
| CuSO4 | -1.6 | 11.9 |
| MnSO4 | -4.2 | 20.6 |
| KCl | -11.1 | 19.6 |
| NaCl | -21.2 | 23.3 |
| MgCl2 | -33.6 | 21.6 |
| CuCl2 | -40 | 36 |

FIG. 5

Air
    140,000 pounds air/hour
       0.24 BTU/# F
         70 F
      -175 F
    8,232,000 BTU/hour Water to Ice
    104,200 gallons water/day
        64 pounds/cu ft of salt water
     0.134 cubic ft/gallon
    891,489 pounds/day
         1 BTU/(# F)
        70 F
      -5.8 F
      144
     0.43 BTU/(# F)
      -5.8 F
       -10 F
197,559,287 BTU/day
       24 hours/day
    8,231,637 BTU/hour

FIG. 7

DOWNDRAFT 140,000 #/hour
    0.14 #/cu ft air at -175 deg F
16887 cubic feet per minute
     10 feet per side of square cross-section
   100 square feet cross section
   2.81 feet per second downward velocity

---

900 microns diameter droplet
  150 inches per second terminal velocity
  12.5 feet per second terminal velocity 50 feet height of chamber
15.31 feet per second terminal plus air velocity
 3.26 seconds flight duration

---

400 microns diameter droplet
   62 inches per second terminal velocity
 5.17 feet per second terminal velocity 50 feet height of chamber
 7.98 feet per second terminal plus air velocity
 6.26 seconds flight duration

FIG. 10

UPDRAFT 140,000 #/hour
    0.14 #/cu ft air at -175 deg F
16887 cubic feet per minute
      8 feet per side of square cross-section
    64 square feet cross section
  4.40 feet per second downward velocity

---

900 microns diameter droplet
  150 inches per second terminal velocity
 12.5 feet per second terminal velocity 20 feet height of chamber
8.10 feet per second terminal plus air velocity
2.47 seconds flight duration

---

400 microns diameter droplet
   62 inches per second terminal velocity
 5.17 feet per second terminal velocity 20 feet height of chamber
0.77 feet per second terminal plus air velocity
26.01 seconds flight duration FIG. 13b
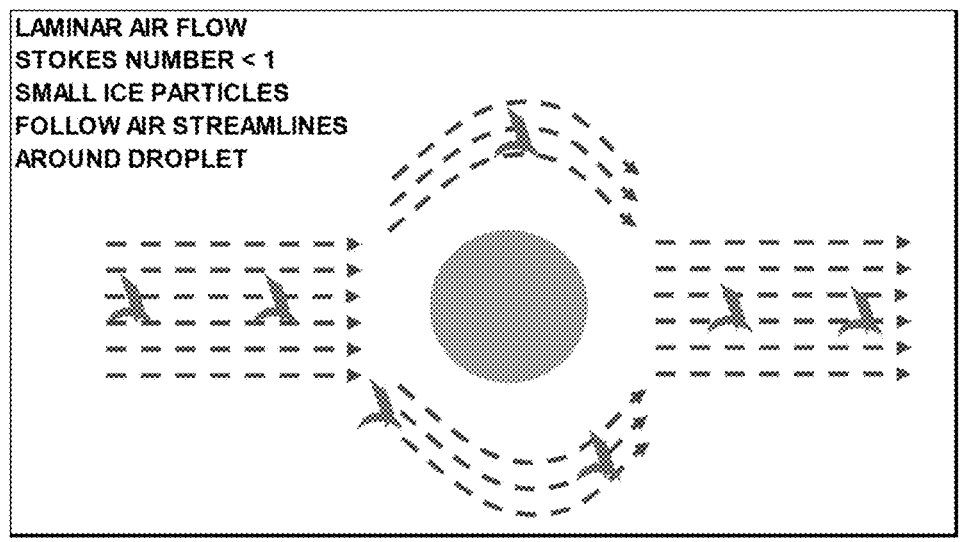
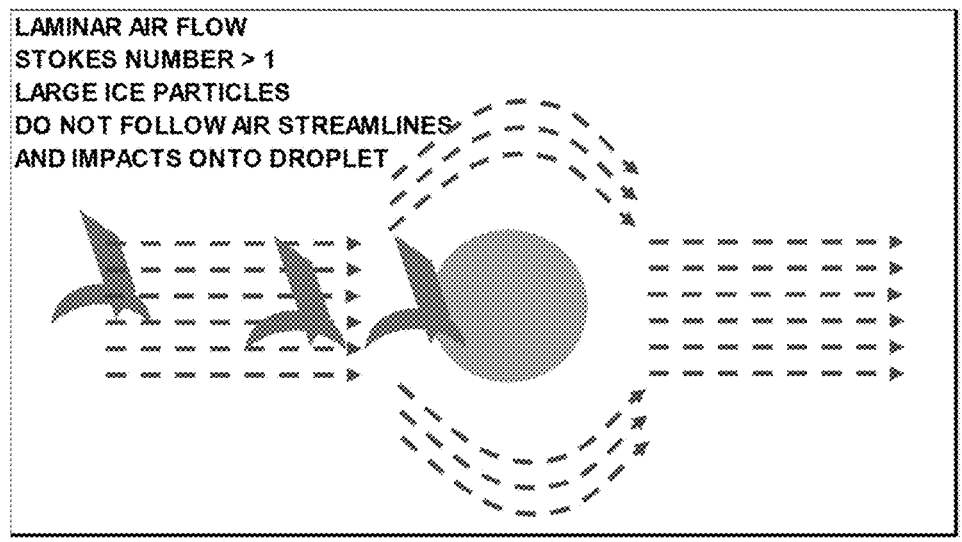

FIG. 13c

| | |
|---|---|
| Dp | equivalent diamter of ice particle |
| 7 | microns |
| 0.00002296 | feet |
| | |
| RHOp | density of ice particle |
| 56 | pounds/ci ft |
| Vair | upward velocity of air *** |
| 20 | inches/sec |
| 1.67 | ft/sec |
| mu | dynamic viscosity of air at -20 deg F |
| 1.07448E-05 | #m/(ft-sec) |
| Dd | equivalent diameter of droplet |
| 900 | microns |
| 0.002952 | feet |
| Stokes Number | |
| 0.09 | hence <1 |

| | |
|---|---|
| nu | kinematic viscosity of air |
| 0.000119386 | ft2/sec |
| Vair | upward velocity of air |
| 1.67 | ft/sec |
| Dp | equivalent diamter of ice particle |
| 0.00002296 | feet |
| Reynolds Number | |
| 0.32 | hence <1 |

*** 900 microns diameter droplet terminal velocity downward is 160 inches/second

DOWNDRAFT FREEZE CRYSTALLIZATION SPRAY CHAMBER

EXPLOSIVE SEPARATION OF IMPURITIES FROM WASTE WATER IN FREEZE CRYSTALLIZATION SPRAY CHAMBERS

BACKGROUND

A wastewater mixture of solutes and water solvent will freeze at lower and lower temperatures with corresponding increased concentration of solutes. Higher concentrations of salt require colder and colder temperatures for ice (pure water in frozen state) to separate from the saltwater solution (brine). As the temperature reduces further, more ice separates and the remaining liquid contains the same amount of salt but less water, thus the remaining solution becomes more concentrated. The solid ice is of lower density and the liquid brine is of higher density so the solid ice floats to the top of the liquid brine.

When the temperature is further reduced, liquid brine reaches a saturation solution of salt in the brine. Salt starts to form from within the brine. Since the salt crystals are denser than the saturated brine, the salt crystals deposit at the bottom of the saturated brine solution. This is the eutectic point.

Depending on the temperature setting, the following salts are produced in the process: −1.3 degrees Celsius (° C.) produces Glauber's salt, used in washing powders and detergents; −2.0° C., produces gypsum, used for buildings, walls, plaster of Paris; −3.9° C. produces Epsom salt; and −21.12° C. produces table salt.

Large quantities of polluted water are inevitable with mining, but a pioneering freeze crystallization waste-water process, which began operating Aug. 10, 2017 after 10 years of research, has been hailed as a revolutionary step in addressing South Africa's water crisis.

The hi-tech system, which uses a specialized freezing process to extract clean water from the brine byproduct of desalinated mining water, has begun operating at Glencore's Tweefontein coal mine in eMalahleni, Mpumalanga, South Africa.

When fully operational, it will produce 500,000 liters of potable water a day, most of which is due to be sold to the local municipality for use by residents. It is believed to be the first time in the world that this technology has been implemented on such a large scale, and, if rolled out to similar mines in South Africa, it could produce billions of liters of additional potable water daily.

Some 95% of polluted coal mining water can be converted to potable water through desalination. The remaining 5% is brine, which until now has been pumped into large pools so it can evaporate. This process is expensive, time-consuming and not completely effective. That 5% equates to 500,000 liters of clean water a day once it has gone through the hi-tech freezing process.

Research for the system, called eutectic freeze crystallization, was funded by the Water Research Commission and the Coaltech Research Association, a collaborative initiative between the Chamber of Mines, several mining companies and the universities of the Witwatersrand, Johannesburg and Pretoria.

Jo Burgess, of the Water Research Commission, said: "If we could have [this system] at every mine which currently has brine ponds, we could recover billions of liters of water and use it for domestic and industrial water supplies. We could alleviate the drought instead of wasting all that evaporated water—millions of liters each and every day. South Africa's water supply would be safer and more secure."

The elements required to successfully design a compact, portable, lightweight freeze crystallization spray chamber or a eutectic freeze crystallization spray chamber are: time to freeze a wastewater droplet to form an outer shell of frozen fresh water; time for ice shell to fracture and release interior dense liquid droplet of high concentration wastewater; separation of fresh water ice from mound of ice that has accumulated at the bottom of the chamber by draining dense and high concentration liquid from each ice crystal surface; and further separation of fresh water ice from mound of ice by washing remaining layer of liquid waste water from each surface of ice.

Gerald Stepakoff and David Siegelman presented, "Application of a Eutectic Freezing System to Industrial Waste Water Recycling" at the Industrial Waste Water Reuse Conference, Environmental Section, American Institute of Chemical Engineers in Washington, D.C. on 24 on April 1973, as part of the Avco Water Purification Program of the Avco Systems Division, Wilmington, Mass. The freezing was carried out by direct contact heat transfer, by evaporation of an immiscible refrigerant from the waste water in a closed vessel. The process uses Freon refrigerants (nonflammable and non-toxic), direct contact heat transfer, stirred tank or spray freezers, cyclone separators, and a pressurized counterwasher.

The eutectic freezing process has application to both brackish water and industrial waste water treatment. In the case of brackish waters, many inland desalting plants operate to recover from 50 to 80% of the feed water as fresh water. However, a concentrated waste brine stream is also produced along with the product water, and the volume of this waste may comprise 20% to 50% of the feed volume flow. This presents a formidable disposal problem. For the latter case, many industrial wastes contain dissolved solids which have economic value if recovered and returned to the main process. Also, in many cases, the waste waters cannot be disposed of because of the toxicity of the dissolved chemicals. Freezing or eutectic freezing involving two-stage freeze concentration, can be incorporated in such cases into a recycling process for water reuse of industrial and chemical wastes industrial and chemical wastes.

There are several general advantages of freezing for purifying waste water as well as specific advantages of the freezing or eutectic freezing process for recovery of dissolved solids. In general, freezing processes have a low specific energy requirement. For example, with a 3.5% saline sea water feed the specific energy is about 45 to 50 kwhr/1000 gallons of product for a 1 mgpd (1 million gallons per day) plant. Freezing processes based on a secondary refrigerant process have low capital cost and there is virtually no corrosion because of the low temperatures.

The freezing process is also nearly universal in that there are no restrictions on the feed composition or chemical makeup of the waste water. Eutectic freezing, which is the companion process to the secondary refrigerant process, has the advantage of achieving very high concentration factors with a large reduction in waste volume. In many cases, it is possible to produce a solid waste which is easier to dispose of than a liquid. The process can recover valuable solids without corrosion. It has lower power consumption than evaporation. There are no geological handicaps, as with deep well disposal. There are no climatic restrictions or large land area requirements, as with solar evaporation. Finally, eutectic freezing plants can be used in conjunction with waste brine from any type of primary processing plant using Reverse Osmosis, Electrodialysis, evaporation, or freezing. This freezing is carried out by direct contact heat transfer by evaporation of an immiscible refrigerant, from the waste water in a closed vessel. However, it would be beneficial to carry out freezing at much colder temperatures.

Wa Gao's doctoral thesis at the University of Alberta is entitled, "Partial Freezing by Spraying as a Treatment Alternative of Selected Industrial Wastes", 1998. The principle objective of this study was to evaluate the spray freezing process as treatment alternative for industrial wastewater. It included the investigation of the ice nucleation characteristics of pulp mill effluent, piggery wastewater and oil sands Tailings Pond Water (T.P.W) droplets, the freezing behavior of freely suspended wastewater droplets and impurity rejection and concentration phenomena occurred in the freezing and melting process.

The laboratory experiments showed that wastewater droplets made from different wastewater froze at different temperatures when they were tested under the same experimental conditions. When a water drop was freely suspended in an updraft of cold air, the freezing started at the bottom of the drop and then spread over the entire surface enveloping the drop in an ice shell. The freezing temperature of a droplet was influenced by the nature of the wastewater, the ambient air temperature, the droplet size, the impurity concentration and the pH of the wastewater.

When wastewater was sprayed into a cold atmosphere, the contaminants in the wastewater were rejected by the growing ice crystals and were concentrated in the liquid phase as part of the sprayed water froze. The unfrozen water generated in the spray freezing process could carry away more than 50% of the impurities in the source water from the ice mound. The spray ice impurity concentration could be predicted by a mathematical model based on the mass balance of the impurity in the continuous spray freezing process.

After a wastewater drop was introduced in the updraft, it remained liquid as it was super-cooled. The larger water drop suspending in air did not maintain a "spherical" shape: it exhibited a marked flattening on its lower surface and smoothly rounded curvature on its upper surfaces. The deformation increased as the droplet volume increased.

The video recording reveals that freezing starts at the bottom edge of a water droplet and then envelopes the whole surface area of the top progressively at all ambient temperatures used for this study. Then, it freezes inward and the ice shell thickens as phase change continues.

Plate 4.1 shows the freezing process of a 2.8 mm diameter pulp mill effluent drop. The ambient air temperature was −5.5° C. and humidity 80.1%. The droplet was introduced into the updraft of the wind tunnel.

After 1/30 second, freezing started at the bottom edge of the droplet. The freezing proceeded to the entire surface of the droplet. The droplet surface freezing was completed in 7/30 second.

The time required to envelop the entire drop surface area of different drops varied. It depended on the freezing temperature (or cooling rate) and the type of the water. Under the same conditions, tap water or distilled water (with food color) drops, only needed 2/30 to 3/30 second to finish the surface freezing. But it took more time to envelop the surface of wastewater drops (3 to 4 frames or even longer) although the time required to initiate the freezing by the wastewater drops was much shorter.

Plate 4.2 (Gao Thesis) displays the freezing of a 3.4 mm diameter piggery wastewater drop in a −17.7° C. environment and the pH of the droplet was adjusted to 11.0. It again took 7/30 second, while it only took 4/30 second for a 4.2 mm tap water droplet to finish the surface freezing. It was even shorter, 2/30 seconds, for the ice formation on the surface of a 4.2 mm distilled water drop to which red food coloring had been added.

Blanchard (1955) observed freezing of large water drops suspended in a vertical wind tunnel. In his work Blanchard showed that the manner of freezing is a function of drop temperature. Blanchard indicated that −5° C. was the approximate dividing temperature between clear ice which forms at warmer temperature and opaque ice which forms at colder temperature.

The phenomena of fragmentation of freezing water drops was observed by many researchers (e.g. Mason, 1965a: Langham and Mason, 1958: Mason and Maybank. 1960: Dye and Hobbs. 1968; Hallett. 1968 and Hobbs and Alkenzweeny. 1968). It also was observed in the Blanchard (1955) study that as freezing proceeded the ice shell of some drops fractured and the unfrozen liquid inside of the drop squeezed out on to the ice surface of the drop.

The crack usually occurs at the top of the drop. Then a protrusion formed as the top continued to remain suspended in the updraft. Among the wastewaters tested, formation of protrusion only occurred in pulp mill effluent and Tail Pond Water (T.P.W.) and no bulging ever occurred in the piggery wastewater drops. The impurities will be concentrated in the unfrozen liquid and then is squeezed out of the drop.

Fracture of the ice shell of frozen drops occurs in the second stage of freezing. During this stage of freezing, as mentioned before, ice continues to grow rapidly inwards from the surface of the drop. Expansion caused by phase change of the water inside of the drop during this stage builds up pressure in the interior of the drop. Rupture of the shell, occurs at a weak point where a protrusion forms as the liquid from the interior is extruded, The probability for a drop to fracture or fragment during freezing is affected by many factors. It is known that the nucleation temperature of the drop is one of them. The probability of fragmentation is higher for a drop with higher nucleation temperature since there is a larger amount of water remaining to undergo phase change in the second stage of the freezing.

Mason and Maybank (1960) indicated that the air content of the water influences the shattering of freezing water drops. The air content of a drop is controlled by the drop temperature since the solubility of air in water increases rapidly with decreasing temperature. When a drop nucleates at a warmer temperature, a very small amount of air can escape from the surface to the atmosphere and the ice shell formed is mechanically strong. A protrusion may appear at the weak spot and develop into a spike. A drop may even break into several fragments when the expansion of the interior cannot be held by extrusion through spikes and through the nearly impervious shell. Larger quantities of air would be liberated and trapped in the ice shell and cause a spongy texture in it when a drop freezes under strong super-cooling. This yields more readily to the expansion, part of which is taken up by compression of the entrapped air. Numerous cracks and fissures appear in the ice shell through which the liquid is exuded. The occurrence of spikes and violent shattering is rare and fewer ice splinters are produced. More recent tests (Sander Wildeman, February, 2017) using a 25 million frame per second camera showed rapid brittle fracture of the ice shell.

The low nucleation temperature of piggery wastewater drops may be one of the reasons that prevent piggery wastewater drops from breaking during freezing. The nucleation temperature of piggery wastewater is several degrees colder than that of pulp mill effluent and oil sands tailing pond water.

It also explains why smaller drops are less likely to fragment: drops with smaller diameter have lower nucleation temperature. Only cracking of frozen drops were observed in this study and no shattering of drops occurred.

Dye and Hobbs (1968) pointed out that except for the nucleation temperature of the drop, the nature and concentration of gases dissolved in the drop prior to its nucleation, the condition of the drop with respect to its environment and the manner in which heat is removed from a drop will affect the freezing behavior of a suspended drop.

Dye and Hobbs (1968) found that if drops which are nucleated before coming to thermal equilibrium with the environment, or are nucleated at warmer temperatures and then freeze rapidly at a lower temperature will show more disruptive activity during freezing than do drops frozen at thermal equilibrium. A fast freezing rate and symmetrical heat transfer are likely to favor fragmentation. Since the ice shell has less time to accommodate to the rapidly increasing pressure at fast freezing rate, the chances for a frozen drop to break may increase. If the ice shell freezes asymmetrically, it will not have a uniform strength so the pressure may be relieved at a weak point in the shell by forming a protrusion or a spike without shattering of the drop while the pressure may only be relieved by breaking the drop when an ice shell grows symmetrically with respect to the center of the drop.

The spray freezing frozen mass is very porous. The density of the mass is approximately 0.5 to 0.6 g/cc, or almost half that of pure, high quality ice. To look at it, it looks more like snow than ice. The brine therefore drains down through a porous network of voids that is established and maintained as the pile of spray ice forms. As the spray freezing pile grows, there is a constant flow of drained brine out of the base of the pile. Keep in mind that the temperature in the spray ice pile is essentially 0° C. as long as spraying is ongoing, due to the large amount of heat associated with the phase change.

The final product of the freeze crystallization process is very much dependent on the dissolved species in the water. In work at the Colomac Mine, the water contained arsenic and thiocyanates at low concentrations, so was not considered potable. If the only contaminants are say road salts, the final product should have sufficiently low concentrations. However, one must also measure for other dissolved species. The quality of the water also depends on the rate of thawing. Natural thawing under ambient temperatures is generally slow so is more efficient. Higher thawing gradients result in less efficient solute removal.

The time to freeze a droplet is taken from the PhD thesis of Kassem Al-Hakim. "An investigation of spray-freezing and spray-freeze-dryings", 2004. Pages 252 to 254 use freezing temperatures: −25° C.-45° C. and −65° C. or −5.8 degrees Fahrenheit (° F.), −13° F. and −49° F., respectively.

Important data to be taken from Al-Hakim includes that freezing times are increased with increase in droplet diameter, and freezing times are shortened by colder ambient gas temperature. The estimated freezing temperature vs. time profiles shown in Figure (5-56) indicate that a 20 micron drop will freeze in 14 milliseconds at −20° C. or −4° F., depending on the relative velocity profiling of the drop . . . and at 7 milliseconds at −65° C.=−85° F.

Droplets of water can burst apart when they freeze, sending out shards of ice in all directions. Sander Wildeman at the University of Twente in the Netherlands and colleagues have now filmed this process in unprecedented detail—from the formation of the first ice crystal to the final bang. This footage, plus the groups' model-based calculations, reveals when and why water drops rupture as they freeze from the outside in.

The team began by super-cooling a roughly millimeter-sized (1,000 micron) water drop in a specially designed chamber. This step puts the droplet at a temperature below its freezing point but leaves it free of ice crystals, thus ensuring the same starting conditions for all experiments. The researchers then set the freezing process in motion by touching the drop with a tip.

The team's high-speed videos reveal that the freezing process in drops is complex. Within a few microseconds of being touched, a "shell" of solid ice encapsulates the drop and starts to thicken inwards, compressing still-liquid water. Some of the building pressure is released by an "arm" of ice that extends from one side of the drop. But eventually, cracks and bubbles form, and within about two seconds of the process beginning, the droplet shatters. Turning to their model, the group predicts that drops with diameters larger than 50 μm will always explode when frozen because of their high inner pressures. Smaller drops, however, never burst because the surface tension of the shell is strong enough to keep them intact.

SUMMARY

In various embodiments, methods, systems and apparatuses are provided for explosive separation of impurities from waste water in freeze crystallization spray chambers. The specific embodiments described in this document represent examples of the present invention, and are illustrative in nature rather than restrictive.

In an embodiment of the present invention, a wastewater purification system is provided. In the embodiment, the wastewater purification system comprises a chamber having one or more wastewater nozzles are positioned near the top of the chamber. An intake duct is further provided to supply chilled air into the chamber, and one or more exhaust ducts are provided to remove the chilled air from the chamber.

In an embodiment, one or more perforated receptacles positioned near the bottom of the chamber to collect solid byproducts, and a watertight receptacle at the bottom of the chamber to collect a liquid product.

In an embodiment, the wastewater enters the chamber as wastewater droplets via the one or more wastewater nozzles, wherein the wastewater undergoes freeze or eutectic freeze separation due to heat exchange with a high mass flow of the chilled air between the intake duct and the one or more exhaust ducts.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

FIG. 1 is a visualization of the eutectic crystallization freezing process, according to an embodiment of the present invention;

FIG. 2 is a visualization of the crystallization freezing process, according to an embodiment of the present invention;

FIG. 3 is a table of the eutectic freeze crystallization temperatures for several salts, according to an embodiment of the present invention;

FIG. 5 is a calculation of the energy balance for input air flow to output mass of frozen droplets, according to an embodiment of the present invention;

Figure 6:
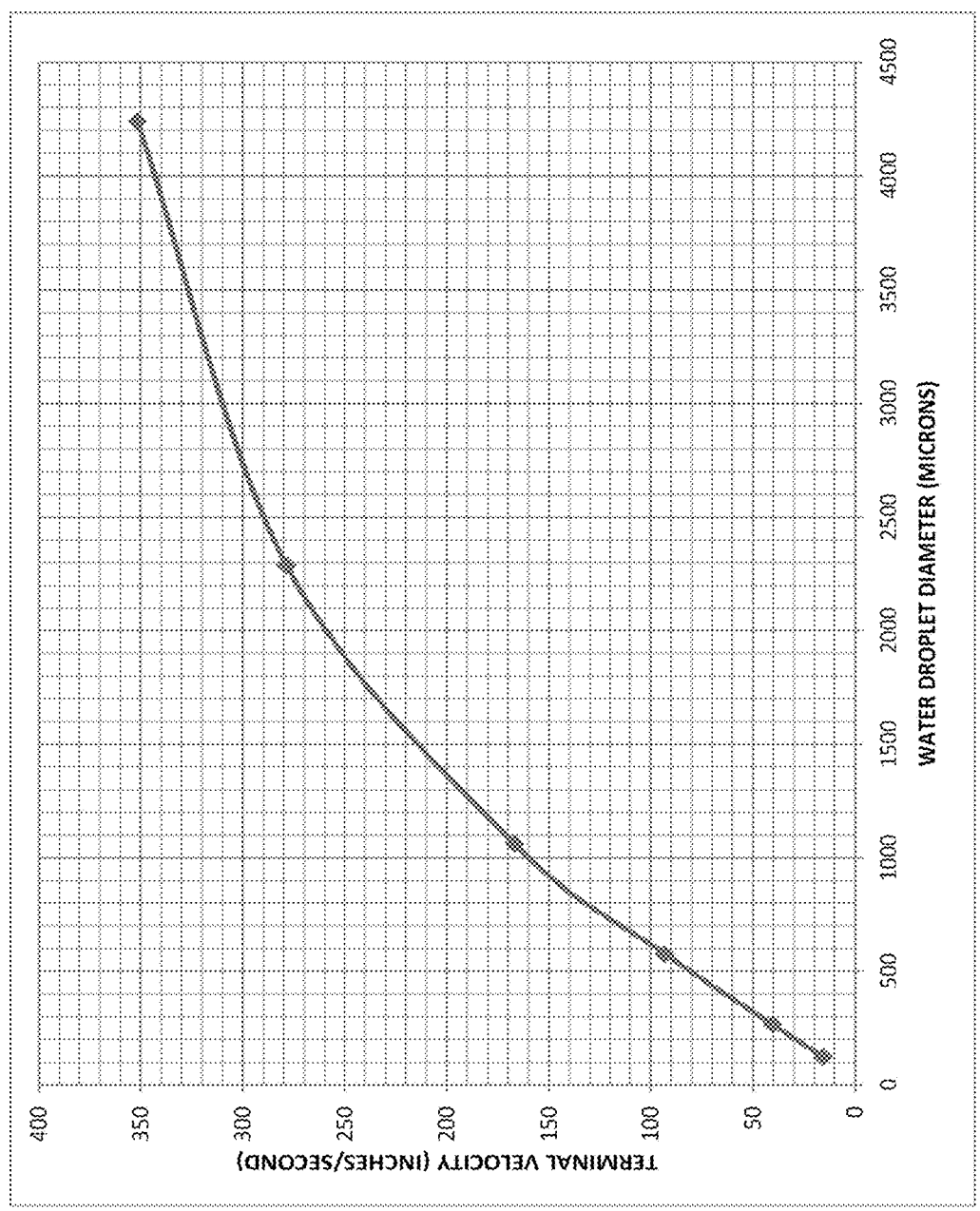
Figure 8:
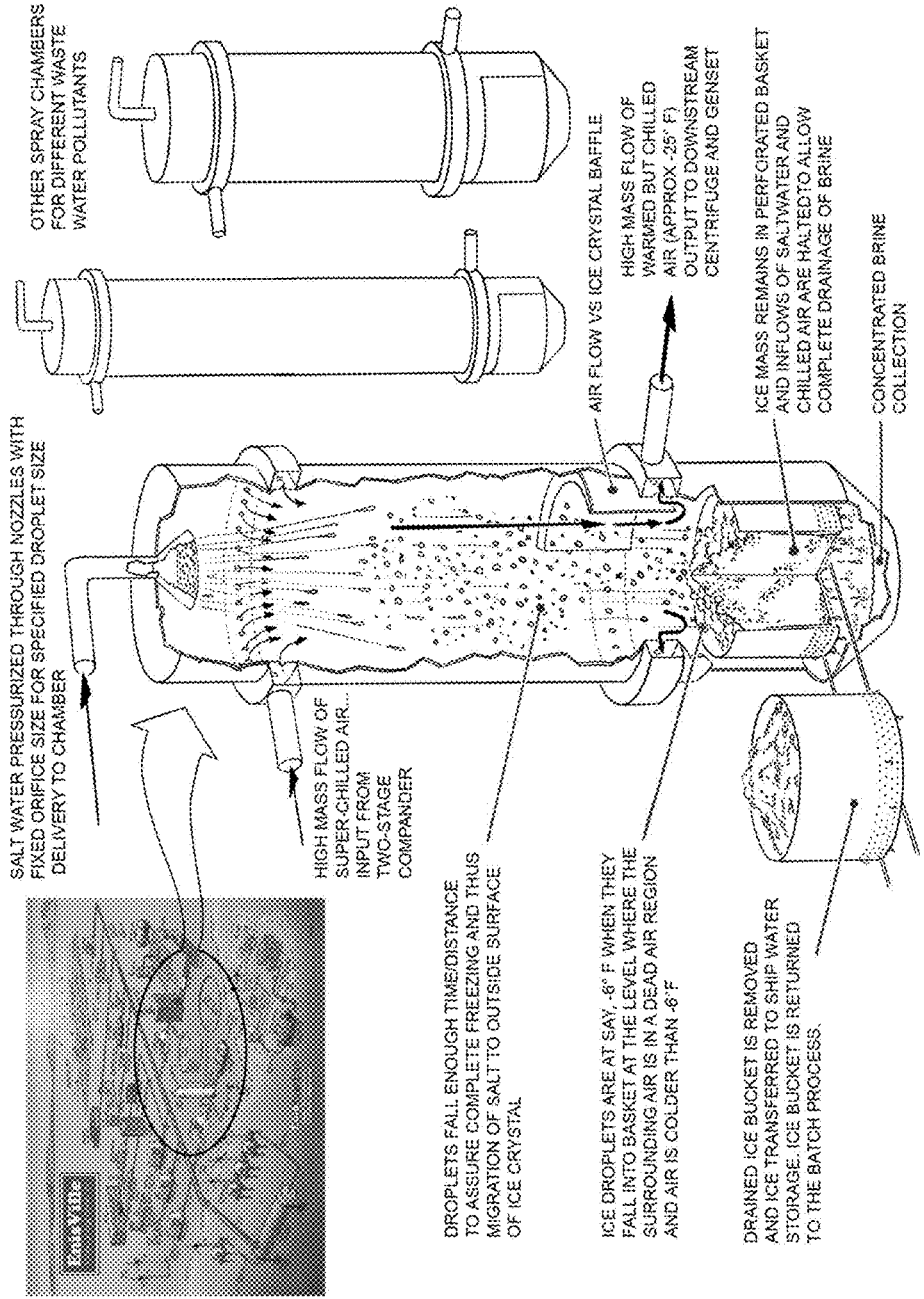
Figure 9:
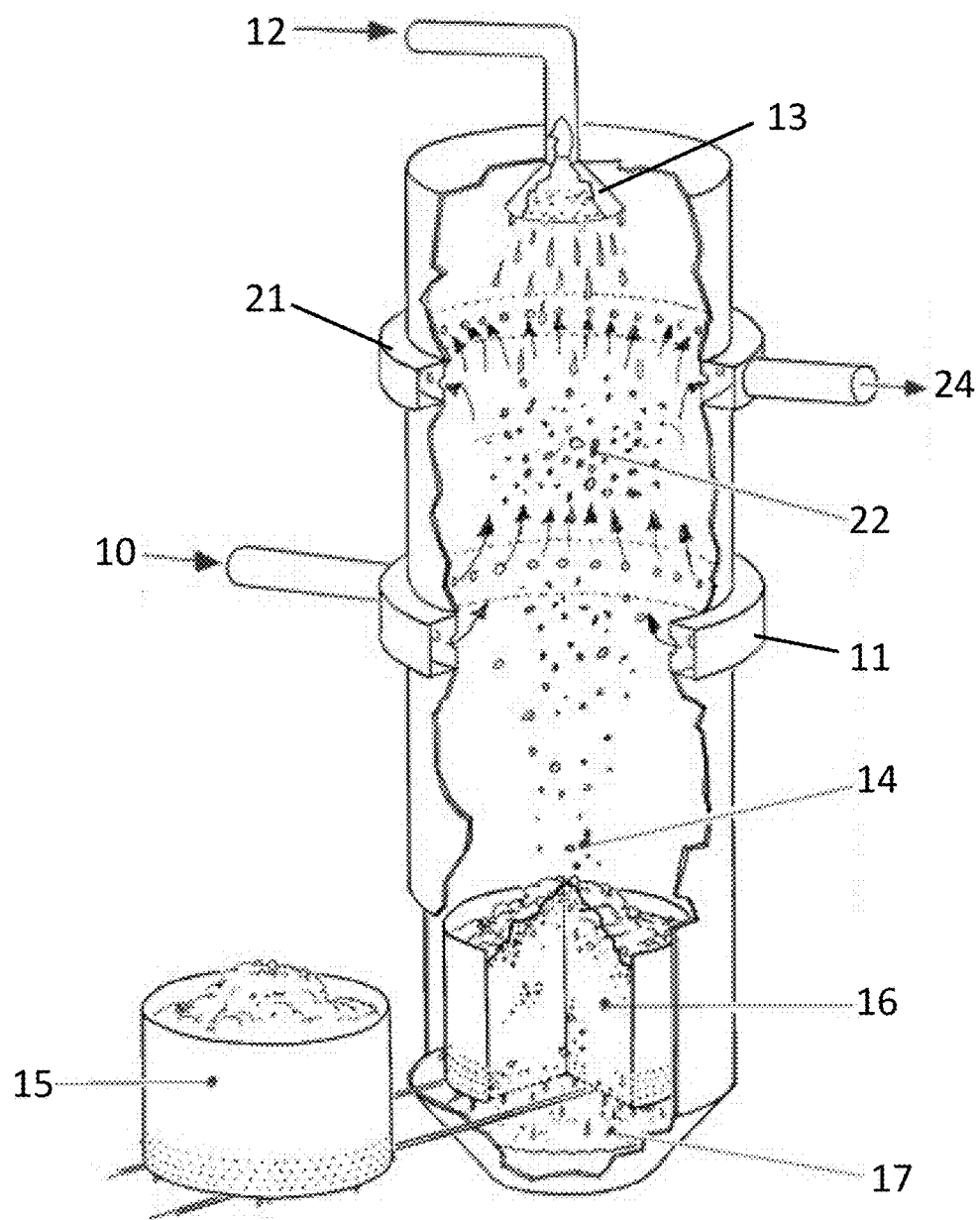
Figure 11:
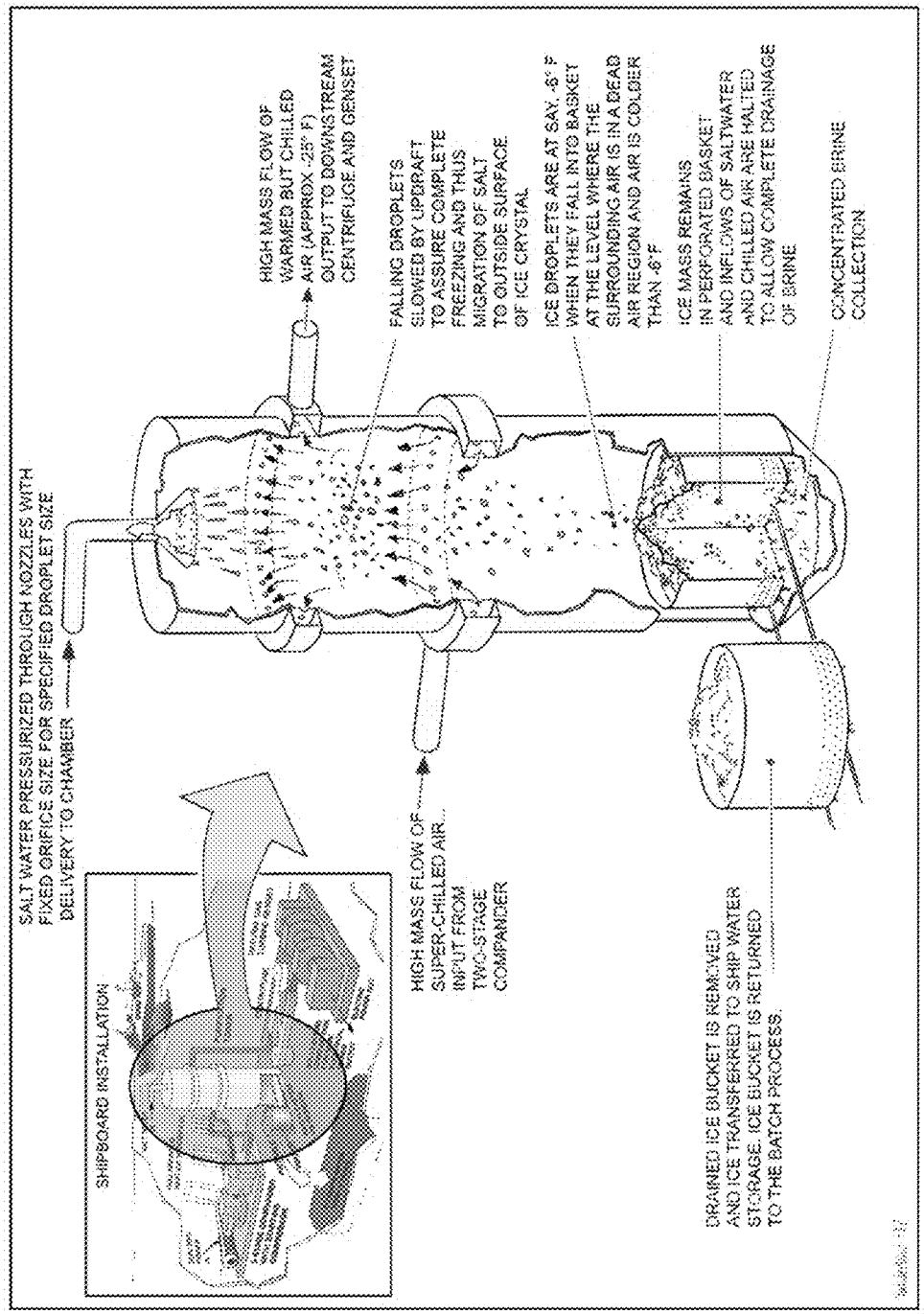
Figure 12:
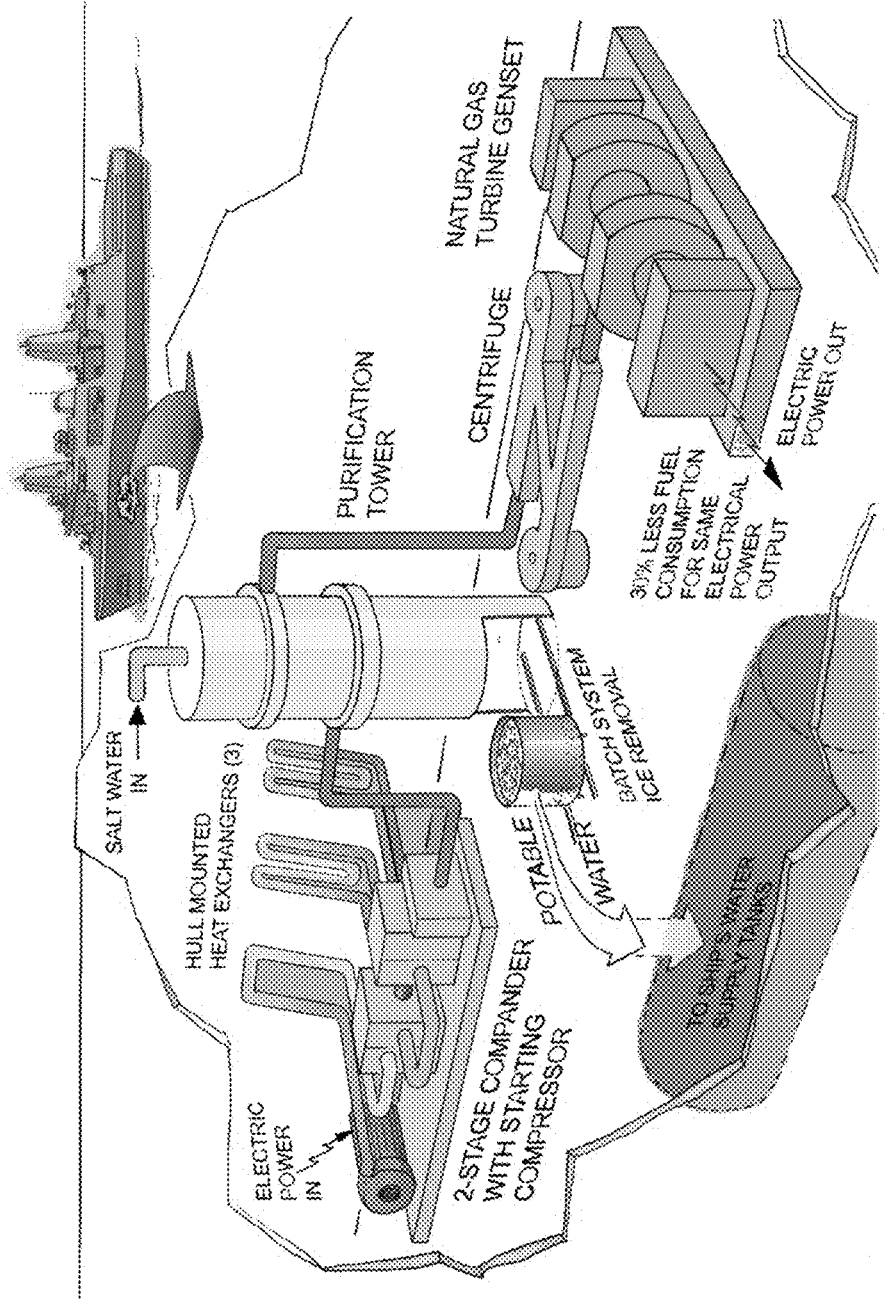
Figure 13A:
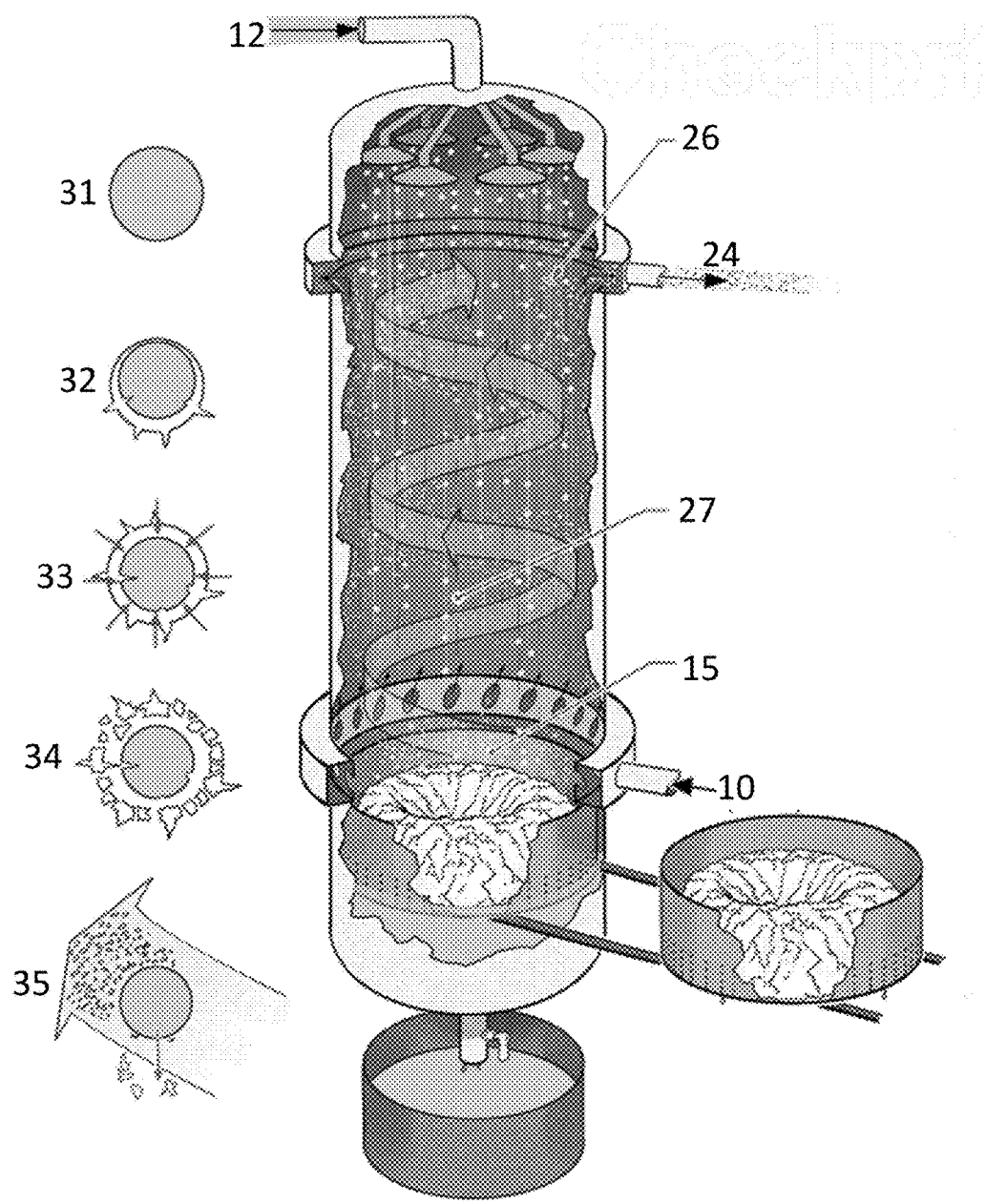
Figure 13D:
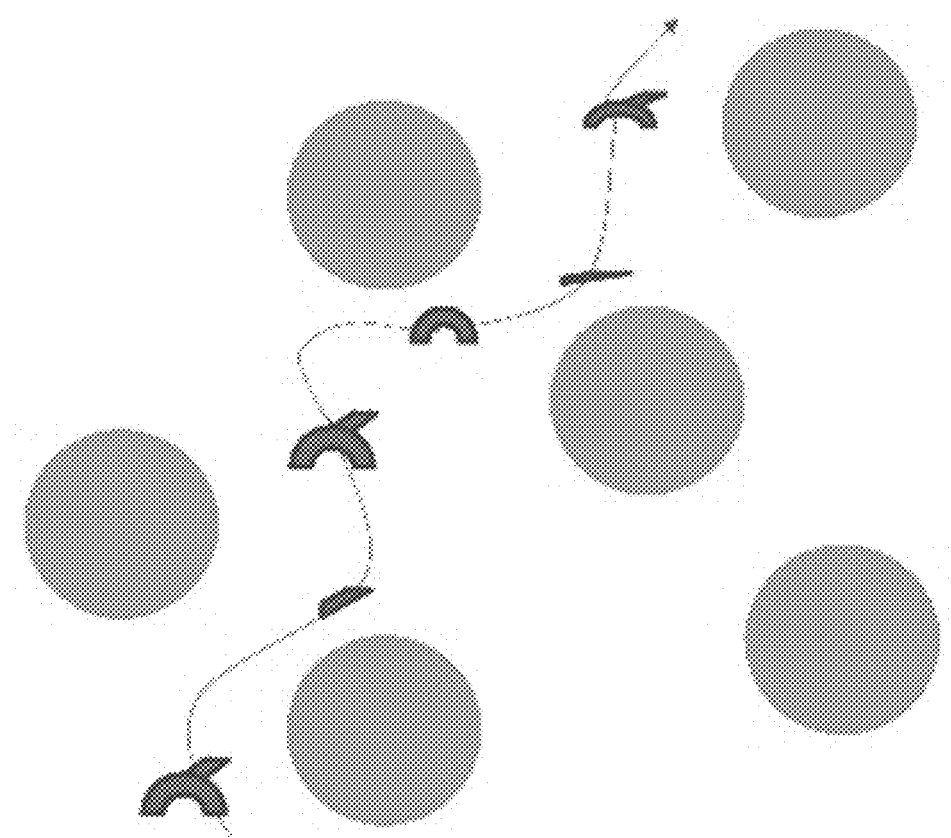
Figure 13E:
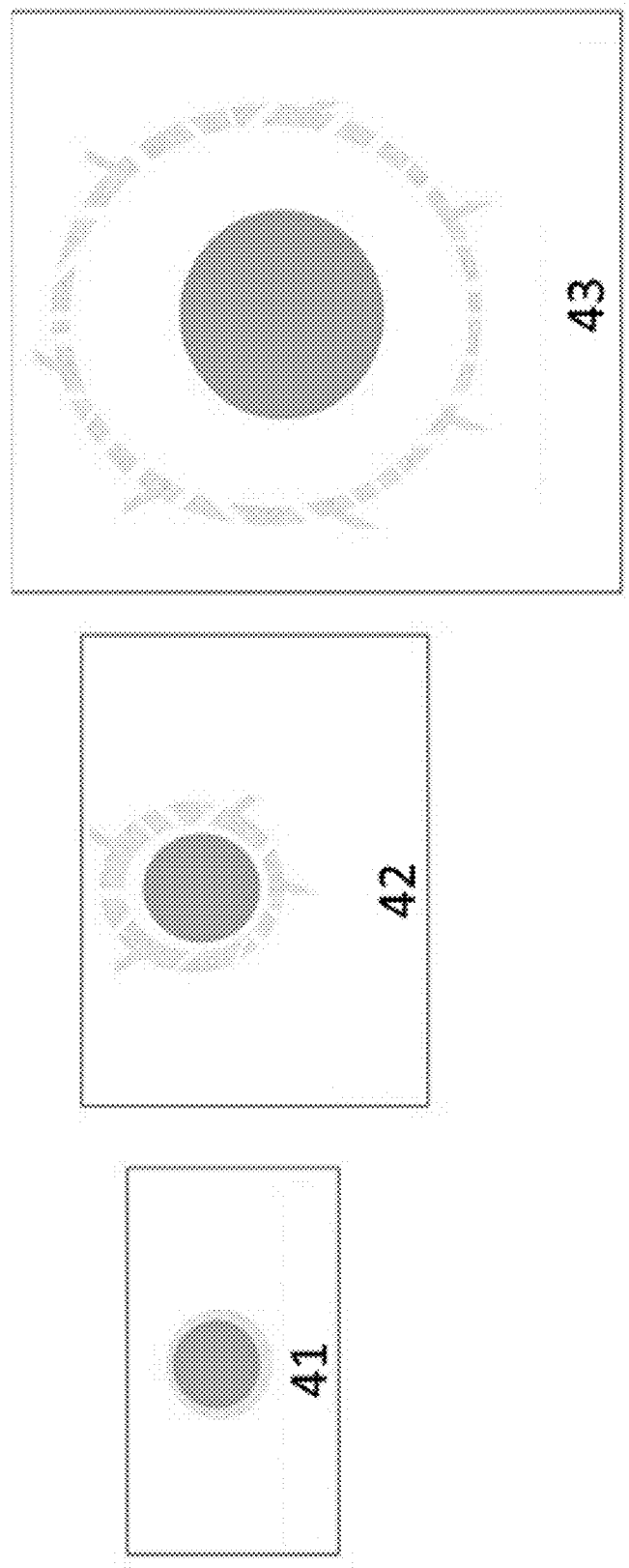
Figure 14A:
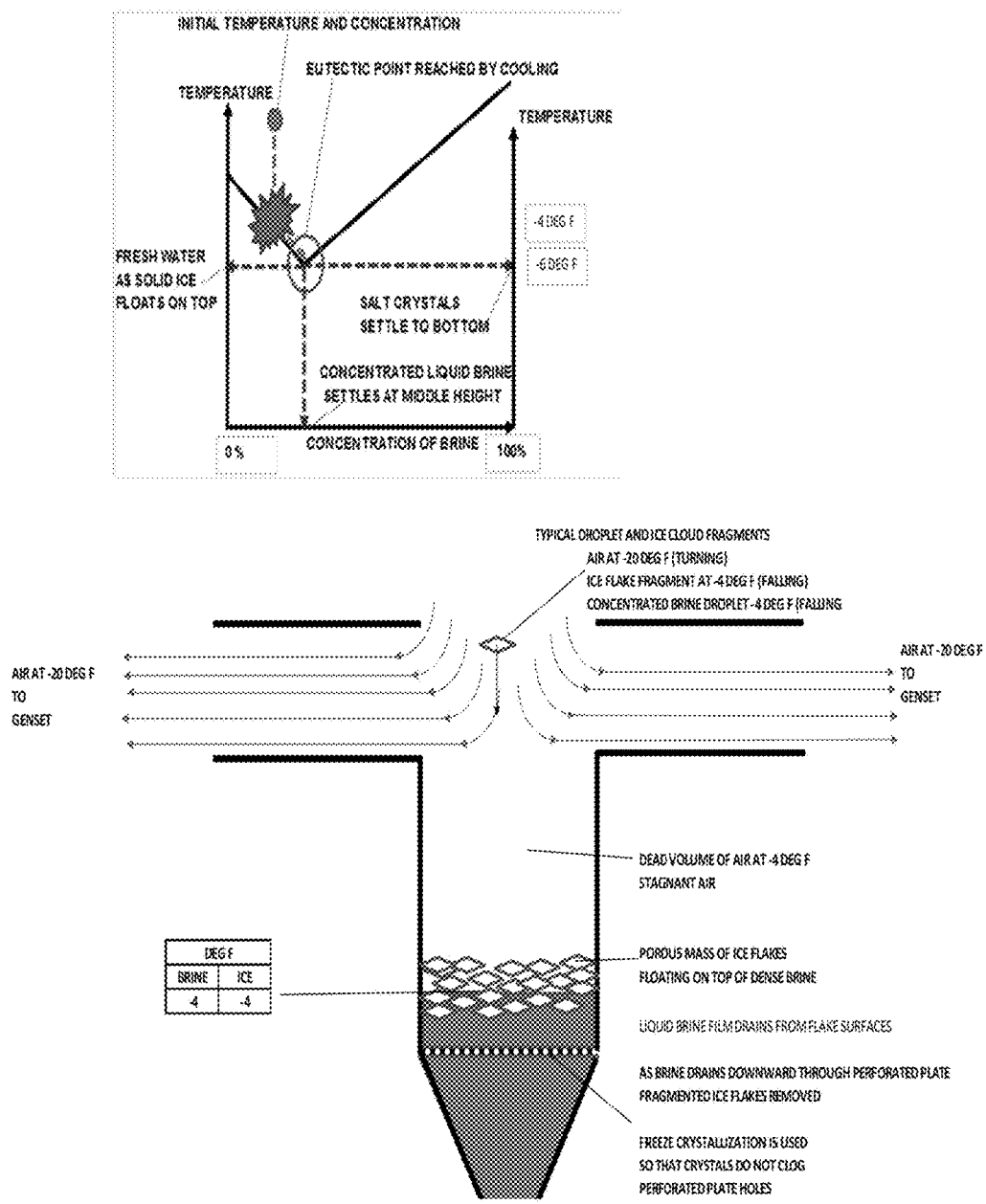
Figure 14B:
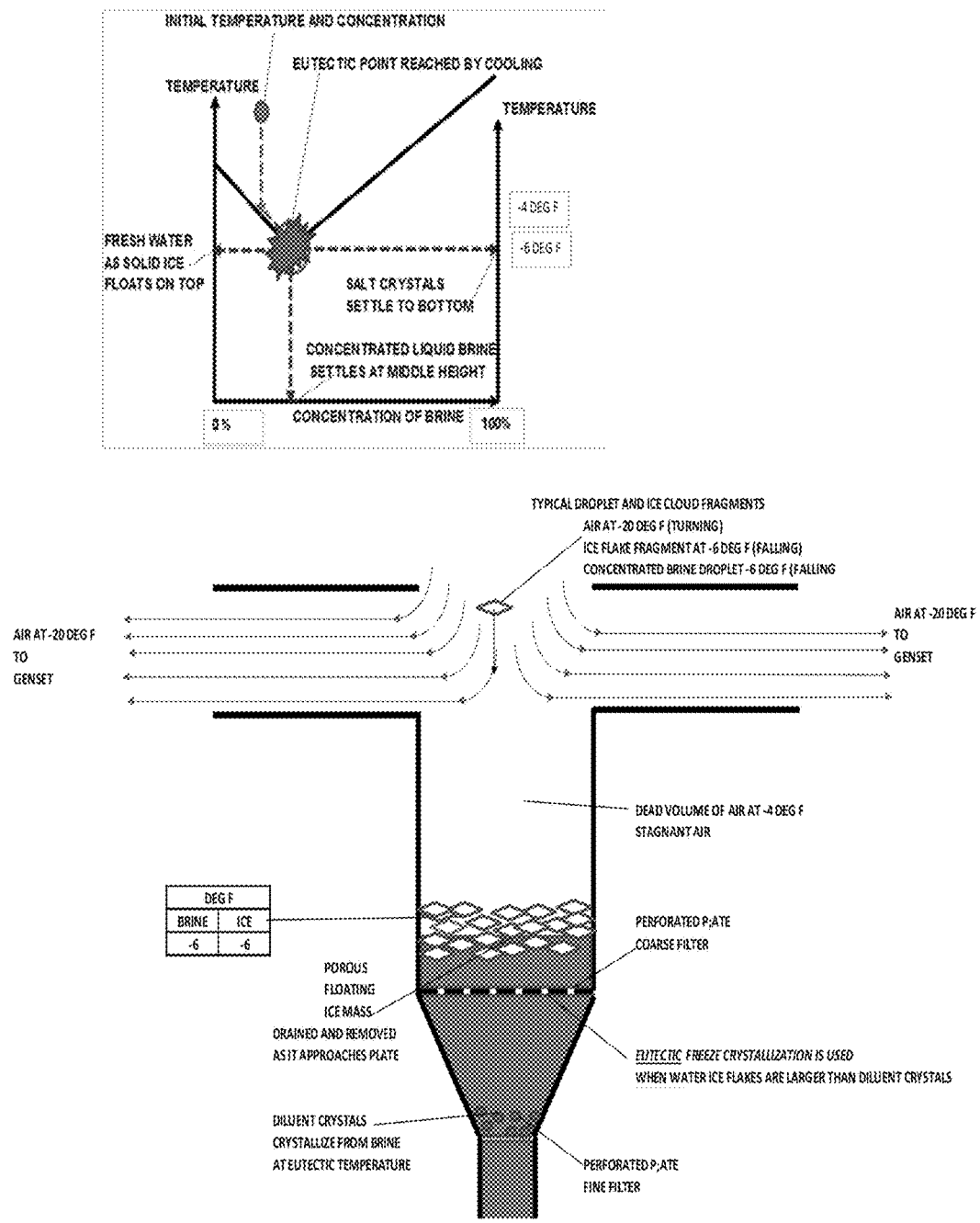
Figure 15:
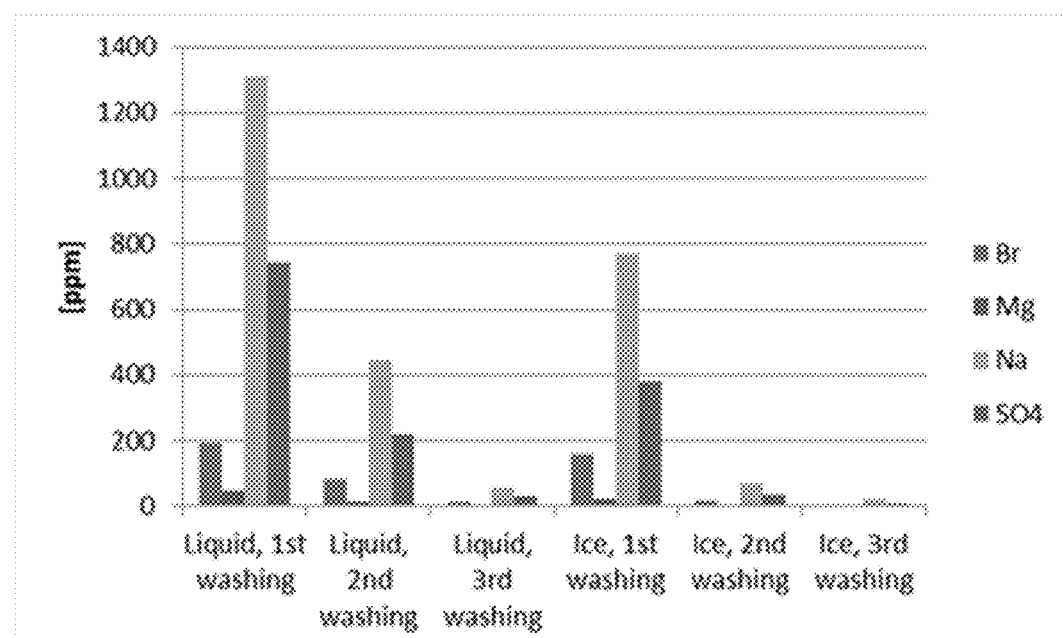

FIG. 6 graphical representation of the terminal velocity of water droplets, according to an embodiment of the present invention;

FIG. 7 is a calculation of required droplet residence times in a downdraft chamber, according to an embodiment of the present invention;

FIG. 8 is a perspective view of a downdraft freeze chamber, according to an embodiment of the present invention;

FIG. 9 is a perspective view of an updraft freeze chamber, according to an embodiment of the present invention;

FIG. 10 is a calculation of required droplet residence times in an updraft chamber, according to an embodiment of the present invention;

FIG. 11 is a perspective view of an updraft freeze chamber, according to an embodiment of the present invention;

FIG. 12 is a perspective view of a shipboard freeze chamber system, according to an embodiment of the present invention;

FIG. 13a is a perspective view of an updraft freeze chamber, according to an embodiment of the present invention;

FIG. 13b is a visual representation of ice and air streamlines around a droplet, according to an embodiment of the present invention;

FIG. 13c is a calculation of explosive flash cooling for a 900 micron wastewater droplet, according to an embodiment of the present invention;

FIG. 13d is a visual representation of upward ice streamlines around droplets, according to an embodiment of the present invention;

FIG. 13e is a visual representation of explosive flash cooling for various sized wastewater droplets, according to an embodiment of the present invention;

FIG. 14a is a visual representation of downdraft freeze crystallization, according to an embodiment of the present invention;

FIG. 14b is a visual representation of downdraft eutectic freeze crystallization, according to an embodiment of the present invention; and FIG. 15 graphical representation of mineral content after numerous washing treatments, according to an embodiment of the present invention.

DETAILED DESCRIPTION

Various embodiments of the present invention and their advantages may be understood by referring to FIGS. 1-15, wherein like reference numerals refer to like elements.

A wastewater mixture of solutes and water solvent will freeze at lower and lower temperatures with increased concentration of solutes. FIG. 1 shows an example of salt and water wherein the higher concentrations of salt require colder and colder temperatures for ice (pure water in frozen state) to separate from the saltwater solution (brine). As the temperature reduces further, more ice separates and the remaining liquid contains the same amount of salt but less water . . . thus the remaining solution becomes more concentrated. The solid ice is of lower density and the liquid brine is of higher density so the solid ice floats to the top of the liquid brine. This is the freeze crystallization process where the freezing is conducted at warmer than the eutectic point. This configuration is used for application wherein potable water is the product or wherein the brine itself is the product.

FIG. 2 shows when the temperature is further reduced, liquid brine reaches a saturation solution of salt in the brine. Salt starts to form from within the brine. Since the salt crystals are denser than the saturated brine, the salt crystals deposit at the bottom of the saturated brine solution. This is the eutectic freeze crystallization process where the freezing is conducted at the eutectic point. This configuration is used when one wishes to recover useful precipitates from the brine as in the cases of purification of gold mine, coal mine, fracking, etc. waste waters.

FIG. 2 shows the Eutectic Freeze Crystallization point where the ice (frozen pure water) floats at the top of the saturated brine solution and salt crystals deposit at the bottom.

FIG. 3 shows the Eutectic Freeze Crystallization temperatures and concentrations for several salts. The eutectic freeze crystallization process can also be used in industries such as textiles, fertilizers, gold, coal and copper mining and fracking.

Depending on the temperature setting, the following salts are produced in the process: −1.3° C. produces Glauber's salt, commonly used in washing powders and detergents; −2.0° C. produces gypsum, commonly used for buildings, walls, Plaster of Paris; −3.9° C. produces Epsom salt; and −21.12° C. produces table salt.

There are three main concepts that are combined to generate the freeze crystallization spray chambers: First, there is the combination of commercially available turbo-expander loaded turbocompressor (compander) in an array that produces a two-stage, free-spooling compander. This combination of turbines intake large mass flows of air and generate output air temperatures in the range of −174.5° F. This extremely cold temperature is beyond the realm of refrigerant driven systems.

Second, the fast freezing of wastewater droplets larger than 50 microns in diameter have recently (Sander Wildeman, February 2017 and Page 17) been photographed at 25 million frames per second as they were exposed to freezing temperatures. The liquid droplet freezes with the extrusion of fresh water from the droplet to form a layer of fresh water ice. The layer of ice thickens with its interior surface reduces in radius and presses against the incompressible remaining liquid while the outer surface grows in radius. The increasing pressure finally increases the stress within the ice shell to the extent that it suddenly fractures. The ice shell fragments propel themselves explosively outwards from the liquid droplet. At the eutectic temperature the ice contains pure water and the liquid in the droplet is at the eutectic concentration of impurities.

Third, Kassem Al-Hakim, "An investigation of spray-freezing and spray-freeze-dryings", 2004, measured freezing of droplets up to the size of 20 microns in diameter at 7 milliseconds at −85° F. (Al-Hakim, Page 15).

The freeze crystallization spray chamber, by extension of recent data, becomes practical in that the residence time for a room temperature wastewater droplet in the range of 400 to 1,200 microns diameter will freeze, expel the fresh water as a thin layer of ice as a shell around the remaining liquid droplet core and then the fresh water ice shell will explosively separate from the liquid droplet in a time span of 1 or 2 seconds at −175° F.

There are three freeze crystallization spray chamber configurations:
(1) Co-Flow . . . DOWNDRAFT FIGS. 4 and 8
(2) Counter-Flow . . . UPDRAFT FIGS. 9, 11 and 12
(3) Counter-Flow . . . UPDRAFT with air rotation FIG. 13

In the downdraft freeze crystallization spray chamber the chilled air and wastewater spray are introduced at the top of the chamber (FIGS. 4 and 8).

Figure 4A:
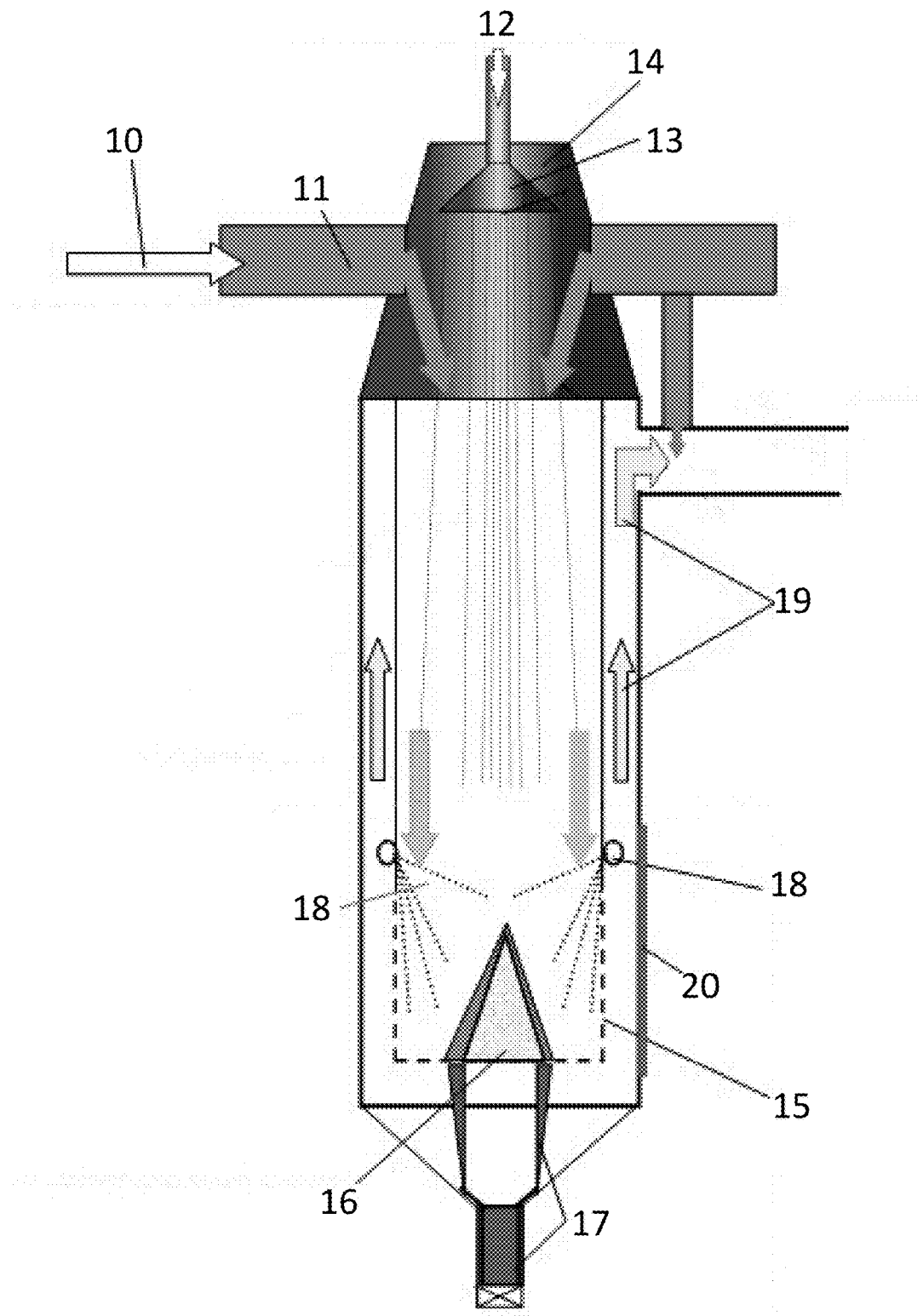
FIG. 4a is a cross-section view of a downdraft freeze chamber, according to an embodiment of the present invention.
Figure 4B:
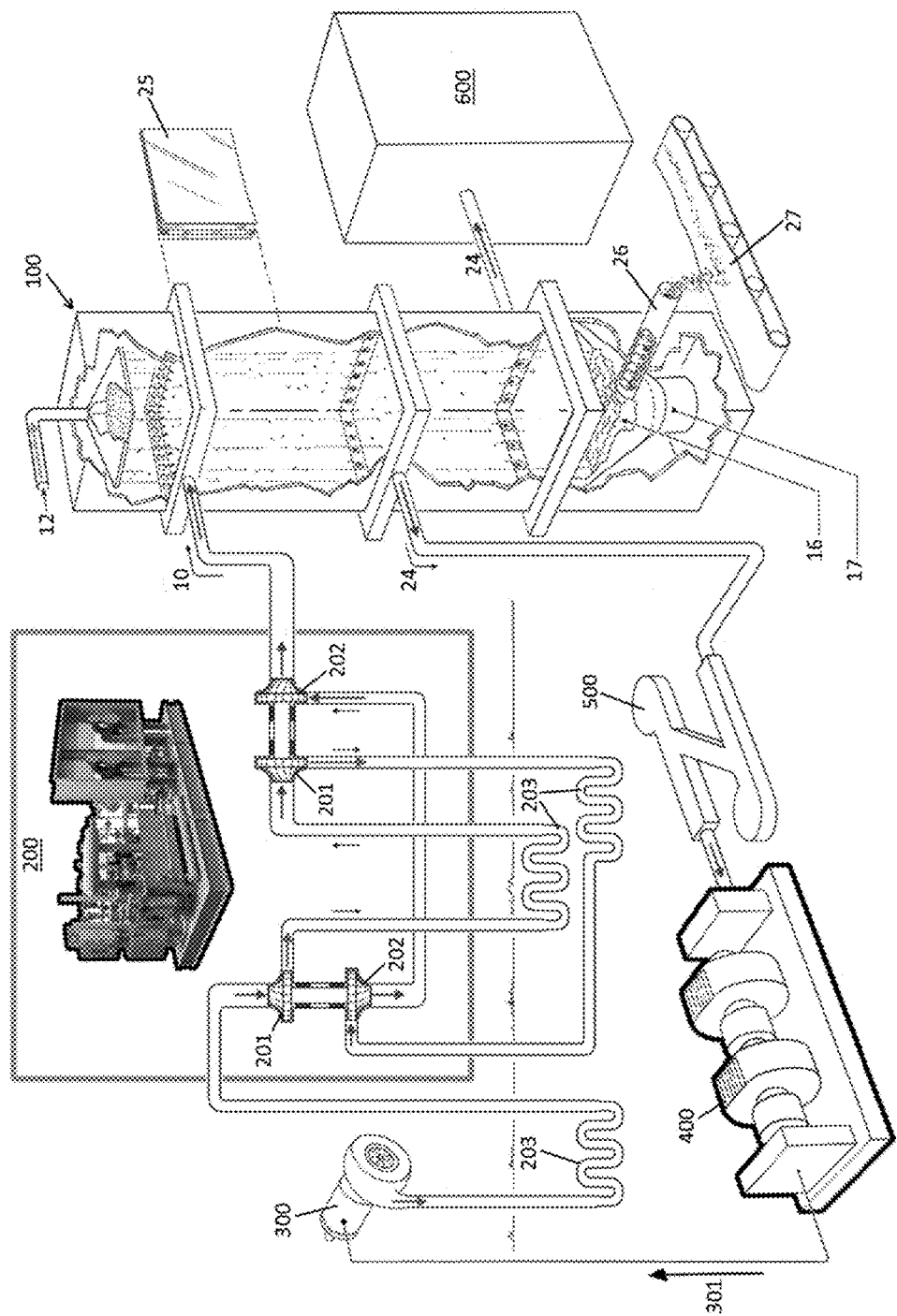
FIG. 4b is a schematic view of a freeze chamber system and connecting components, according to an embodiment of the present invention.
Figure 4C:
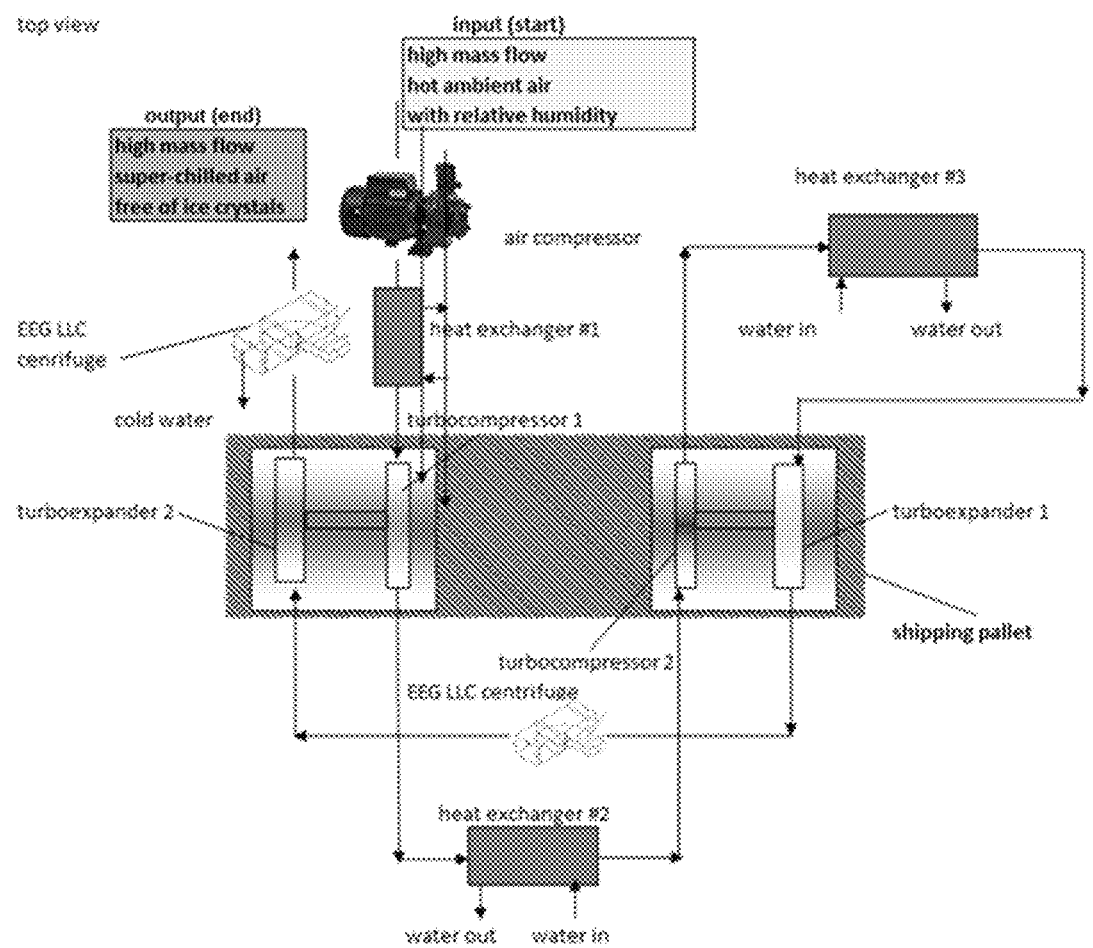
FIG. 4c is a schematic view of the two-stage, free-spooling compander system that is a source of high mass flow of super-chilled are for a freeze chamber system, according to an embodiment of the present invention.
Figure 4D:
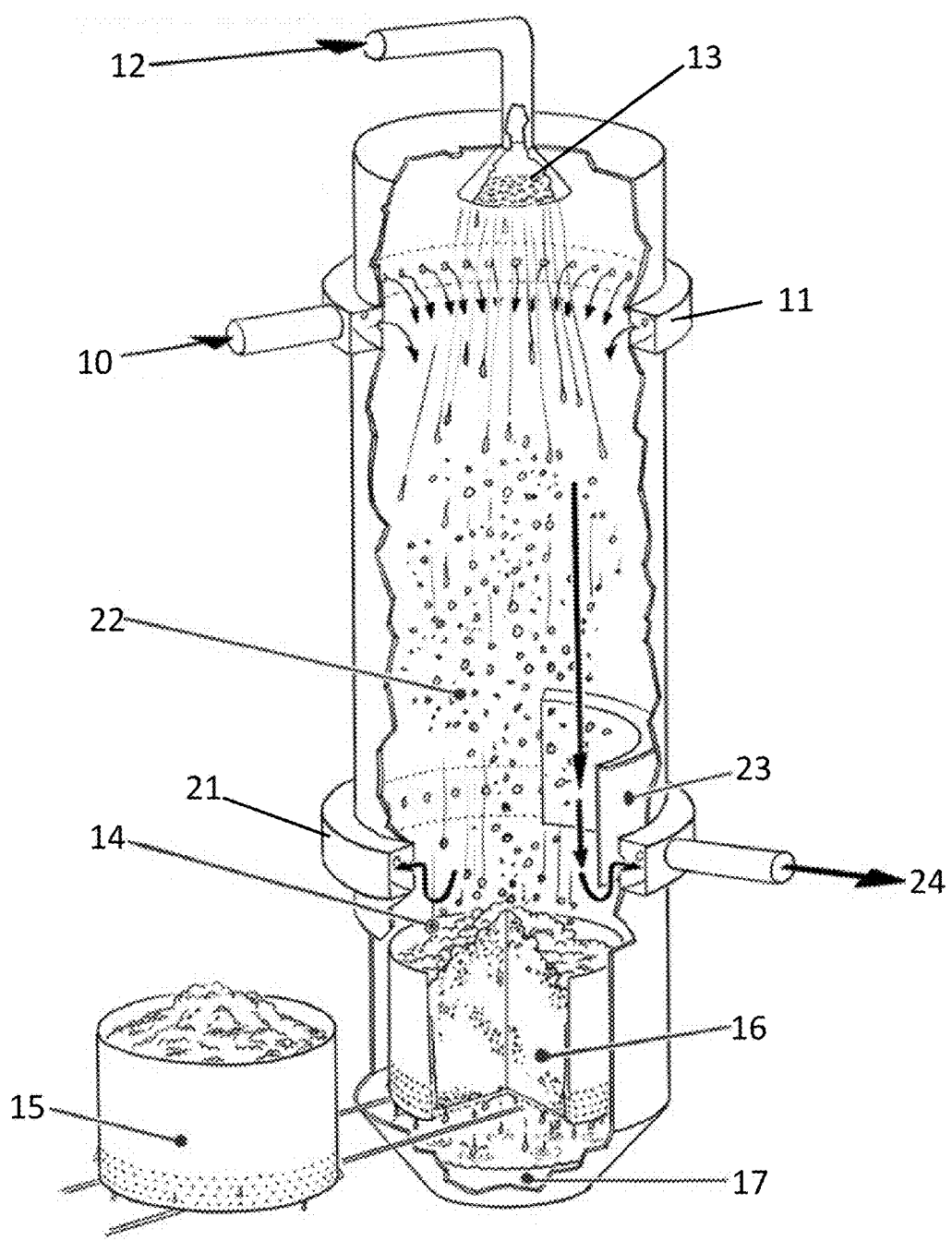
FIG. 4d is a perspective view of a downdraft freeze chamber, according to an embodiment of the present invention.

In reference to FIGS. 4a, 4b and 4c, a schematic of the downdraft freeze crystallization spray chamber is depicted, according to an embodiment of the present invention. In an embodiment, the spray chamber receives exhaust air at air inlet 10. The exhaust air may be sourced from a transfer line compressed air storage system (TL-CAES), transportable compressed air energy storage system (T-CAES), and/or a two-stage, free-spooling compander. In an embodiment, the air enters air inlet 10 as super-chilled air with a temperature of approximately −175° F. and mass flow rate of 140,000 pounds per hour (lbs/hr).

According to an embodiment, with further reference to FIGS. 4a, 4b and 4c, the air inlet 10 feeds the chilled air into intake duct 11. The intake duct then feeds the air into the top of the chamber. In an embodiment, intake duct 11 is provided about the perimeter of the chamber to emit the cold air evenly through the cross-section of the chamber.

According to an embodiment, with further reference to FIGS. 4a, 4b and 4c, the spray chamber receives wastewater at liquid inlet 12. In an embodiment, the wastewater is filtered before entering the liquid inlet to prevent clogging of the spray nozzle 13. In an embodiment, spray nozzle 13 is insulated to prevent ice formation within the nozzle. In an embodiment, the spray nozzle emits wastewater at a mass flow rate of approximately 3060 gallons per hour. In an embodiment, the top of the chamber exhibits a dead space 14, wherein no flow of chilled air is present. The dead space prevents the spray nozzle 13 from experiencing temperatures which may cause ice formation, and therefore clogging within the nozzle.

Further referencing FIGS. 4a, 4b and 4c, in an embodiment, a perforated bucket 15 is provided to collect the frozen ice droplets, which accumulate in an ice mass 16. The perforations of the bucket allow for concentrated brine water 17 to drain through and be collected at the bottom of the chamber. In an embodiment, the ice bucket 15 is removeable through a door (20 in FIG. 4a) to allow for the batch removal of ice from the chamber.

In reference to FIG. 4a, according to an embodiment, the chamber is further provided with fresh water nozzles 18. The fresh water nozzles 18 spray the ice mass 16 to provide further washing of the ice mass. Furthermore, the chamber is provided with an exit duct 19 about the perimeter of the chamber such that the air passes through the perforated bucket 15 as it is exhausted. In an embodiment, intake duct 11 is configured to reintroduce the chilled air to combine with the air of the exit duct 19 before being exhausted from the chamber system. In an embodiment, the air in the exit duct 19 is at a temperature of approximately −6° F. before mixing with the chilled air of the intake duct prior to exiting the chamber system. In an embodiment, the air is exhausted at approximately −22° F. after mixing with the chilled air of the intake duct. In an embodiment, the air is exhausted to an HVAC, cold air storage, or turbine compressor system.

In reference to FIG. 4b, note that the ice is continuously removed by a rotating screw propulsion system that feeds a conveyor belt. In other chamber designs a batch process is used.

In reference to FIG. 4c, according to an embodiment, the chamber is provided with an exhaust duct 21. In an embodiment, the exhaust duct 21 is positioned above the bottom of the chamber, such that a dead air zone 14 is created at the bottom of the chamber. The exhaust duct is provided about the perimeter of the chamber to evenly exhaust the chilled air from the chamber. The configuration provides for the creation of ice droplets 22 at a position between the intake duct 11 and exhaust duct 21. In an embodiment, the air is exhausted at air outlet 24 with at approximately −25° F. after mixing with the chilled air of the intake duct. In an embodiment, the air is exhausted to an HVAC, cold air storage, or centrifuge leading to a gen-set system. In an embodiment, the chamber is further provided with an ice crystal baffle 23.

In reference to FIG. 4b, a schematic of a spray chamber system is shown, according to an embodiment. In the embodiment, a spray chamber 100 is shown receiving chilled air from a two-stage, free-spooling compander system 200. In an embodiment, the air received from the compander system is approximately −175° F.

In the embodiment, the free spooling compander receives air from compressor 300. The air is then sent through a subterranean heat exchanger 203 before being received by the first stage compressor 201 and expander 202. The air is then feed through heat exchangers 203 before being processed by the second stage compressor 201 and expander 202 system, after which it is exhausted to the air inlet 10 of the spray chamber 100.

The spray chamber 100 may be provided with an updraft or downdraft configuration. In the embodiment depicted in FIGS. 4b and 4d, the spray chamber is a downdraft type having a rectangular configuration with a square cross section. In an embodiment, the chamber is constructed of panels formed by foam sandwiched between two steel sheets 25. The spray chamber is further provided with a square spray nozzle at the top of the chamber which receives filtered waste water from the liquid inlet 12. The spray chamber, as depicted, features two exhaust ducts which provide air outlets 24 to a centrifuge system 500 and a cold air storage system 600. The bottom of the chamber collects ice flakes in a porous mass 16 and concentrated waste or brine water 17. In the embodiment, a helical screw 26 is provided to remove the ice flakes from the chamber and onto a conveyor system 27.

In an embodiment, one of the air outlets 24 provides chilled air to a centrifuge system 500. The centrifuge system removes ice particles, which may damage the turbines of the Genset system 400. The Genset system receives the chilled air, with damaging particles removed, from the centrifuge 500. The chilled air improves the efficiency of the Genset system, and the Genset provides electricity to power the compressor 300.

The ratio of chilled air flow input to the wastewater flow input is determined by an energy balance shown in FIG. 5. The chilled air flows downward at a speed dictated by the air mass volumetric flow and cross-section of the chamber.

The droplet speed is initially controlled at the face of the orifice plate at speed dictated by (1) Pressure difference across the orifice plate and (2) Hole diameter in the orifice plate. This combination defines the droplet diameter of the spray. For the larger droplets the hydraulic power requirement is smaller because friction losses are reduced. Also, more total liquid wastewater can be processed with a smaller sprayer diameter containing the multiple orifices of large orifice diameter.

In a short distance from the orifice plate, aerodynamic drag quickly brings the speed of the falling droplet to its equilibrium terminal speed (FIG. 6). The vertical speed of the droplet is the addition of the (1) Vertically downward air speed and (2) Terminal velocity of the droplet.

The height of the chamber and the vertical speed of the droplet produce the residence time for the transition of the warm wastewater droplet to the point where it explosively separates into the concentrated eutectic liquid solution droplet and fragments of fresh ice (FIG. 7). This process also applies to freezing processes that operate at slightly warmer than eutectic temperature so that there is only separation of the ice from the brine and no further separation of the brine into its remaining constituents.

The mass flow of cold air and the mass flow of water are defined so that the eutectic air temperature is achieved near the bottom of the chamber. The accumulated mass of falling solid ice flakes and liquid droplets accumulate at the bottom of the chamber. Liquid drains along the outside surface of the accumulated porous mass and also through the interior of the accumulated porous mass.

In some instances, the process uses the larger diameter droplet, 900 microns for example, to produce a violent separation of the ice shell from the droplet as well as to produce a collection of large sized ice flakes in the accumulated mass at the bottom of the chamber. The larger the fragment of the ice flakes the more porous will be the pile of its accumulated mass and the faster will the drainage of liquid be accomplished. For taller chamber designs, larger diameter droplets can be used because there is more residence time of the falling droplet before it reaches the bottom of the chamber.

The accumulated mass can either be fed from the chamber to the storage room maintained at eutectic temperature as a batch process or as a continuous process.

The residence time of the drainage at the eutectic temperature will be the sum of the times it dwells at the bottom of the chamber as well as the time it dwells in the temperature controlled storage area.

If the desired purification level is not achieved in the chamber and/or in the storage chamber, the washing procedure will proceed. Pure cold water drawn from a portion of the downstream purified water will be sprayed onto the pile. As this cold water freezes more of the film of liquid impurities will be forced off the frozen surfaces of the ice flakes and into the drain.

Since there is so much ice and so much cold liquid, these cold masses will be used to supply HVAC and cold storage facilities to assure energy conservation.

Since many of the solutes have eutectic temperatures warmer than −22° F., the cold air from the eutectic temperature storage room can be combined by tapping a small portion of the input air (−175° F.) to supply input air at −22° F. to a Gen-Set. The Gen-Set will generate 30% more electrical power if it is in a power plant room at temperature of 100° F. The diversion of the input air from the compander will result in less wastewater being produced. However, there are solutes that will require colder eutectic air temperatures so that this tapping of input air will not be required . . . and the Gen-Set will produce its enhanced performance.

Because of the height of the chamber, outdoor applications are required. Thus, the skid-mounted compander and chamber can be placed outdoors alongside a contaminated pond associated with fracking or mining operations (FIG. 7).

Since the chamber has no internal air pressure to contain, the walls need only be strong enough to resist wind and seismic loads. The flow of air through the chamber can be arranged so that the exhausting airflow is forced to flow in an annular space outside the interior chamber to reduce unwanted temperature increases in the airflow mixed with the wastewater droplets inside the interior chamber.

The design of the chamber for about 100,000 gallons per day is depicted in FIG. 4*e*. The chamber cross-section needs to simply have its cross-section increased five-fold to allow for a 500,000 gallons per day process as well as the size of the compander. In either case, the chamber is so lightweight and the compander already on a skid, that the system is portable for movement from site to site.

There are no massive parts or expensive parts required to construct the chamber so that the initial capital investment requirement is low. The compander is the cost driver. However, the compander is a device that makes available a huge volume of refrigeration in a small space with low maintenance.

The eutectic diagram and eutectic tests of the wastewater solution will not only show the temperatures of importance to the phase diagram but also the size of the crystals in the dense layer at the bottom of the brine. When the size of the ice flakes are revealed in the preliminary chamber tests and the ice flake sizes are comparable in size to the crystal sizes, it is necessary to keep the crystals in solution while the ice flakes are trapped on the top surface of the perforated plate (FIG. 14*a*). Thus the heat exchange between falling particle and air results in a particle temperature warmer than the eutectic temperature . . . even though the local air may be much colder than the eutectic temperature. An example set of temperatures are shown at the exit air ducts (−20° F.) while the cloud of ice flakes and liquid droplet are each at −4° F. The dead volume with stagnant air fills with particles and liquids at −4° F. so that the stagnant air temperature is kept at −4° F. This temperature is maintained at a temperature slightly warmer than the eutectic temperature of −6° F.

When the size of the ice flakes are revealed in the preliminary chamber tests and the ice flake sizes are much larger in size to the crystal sizes, it is not necessary to keep the crystals in solution while the ice flakes are trapped on the top surface of the perforated plate (FIG. 14*b*). Thus, the heat exchange between falling particle and air results in a particle temperature equal to the eutectic temperature . . . even though the local air may be much colder than the eutectic temperature. An example set of temperatures are shown at the exit air ducts (−20° F.) while the cloud of ice flakes and liquid droplet are each at −6° F. The dead volume with stagnant air fills with particles and liquids at −6° F. so that the stagnant air temperature is kept at −6° F. This temperature is maintained at a temperature equal to the eutectic temperature of −6° F. The series of a coarse perforation plate and a fine perforation plate permits the separation of the frozen fresh water (ice fragments), concentrated liquid brine and the dense mineral particles. These three separate materials are removed for commercial applications.

The updraft freeze crystallization spray chamber is based upon the same physical principals as the downdraft chamber, except that the droplets fall vertically downward in an upward draft of cold air (FIG. 9). Many of the droplet freeze laboratory tests were conducted in this updraft wind tunnel configuration.

In reference to FIG. 9 an embodiment of a spray chamber is shown having an updraft configuration. In an embodiment, the spray chamber receives exhaust air at air inlet 10. The exhaust air may be sourced from a transfer line compressed air storage system (TL-CAES), transportable compressed air energy storage system (T-CAES), and/or a two-stage, free-spooling compander. In an embodiment, the air enters air inlet 10 as super-chilled air with a temperature of approximately −175° F. and mass flow rate of 140,000 pounds per hour (lbs/hr).

According to an embodiment, with further reference to FIG. 9, the air inlet 10 feeds the chilled air into intake duct 11 which then feeds the air into the chamber. In an embodiment, intake duct 11 is provided about the perimeter of the chamber to emit the cold air evenly through the cross-section of the chamber.

According to an embodiment, with further reference to FIG. 9, the spray chamber receives wastewater at liquid inlet 12. In an embodiment, the wastewater is filtered before entering the liquid inlet to prevent clogging of the spray nozzle 13. In an embodiment, spray nozzle 13 is insulated to prevent ice formation within the nozzle. In an embodiment, the spray nozzle emits wastewater at a mass flow rate of approximately 3060 gallons per hour. In an embodiment, the top of the chamber exhibits a dead space 14, wherein no flow of chilled air is present. The dead space prevents the spray nozzle 13 from experiencing temperatures which may cause ice formation, and therefore clogging within the nozzle.

Further referencing FIG. 9, in an embodiment, a perforated bucket 15 is provided to collect the frozen ice droplets, which accumulate in an ice mass 16. The perforations of the bucket allow for concentrated brine water 17 to drain through and be collected at the bottom of the chamber. In an embodiment, the ice bucket 15 is removeable through a door to allow for the batch removal of ice from the chamber.

In reference to FIG. 9, according to an embodiment, the chamber is provided with an exhaust duct 21. In an embodiment, the exhaust duct 21 is positioned above the intake duct 11. The configuration provides an updraft for the creation of ice droplets 22 at a position between the intake duct 11 and exhaust duct 21. The exhaust duct is provided about the perimeter of the chamber to evenly exhaust the chilled air from the chamber. In an embodiment, the air is exhausted at air outlet 24 with at approximately −25° F. after mixing with the chilled air of the intake duct. In an embodiment, the air is exhausted to an HVAC, cold air storage, or centrifuge leading to a gen-set system. A dead air zone 14 is created below the intake duct 11.

The small ice particles that are carried out of the chamber along the streamlines of the cold exit air, are those ice particles that were forcefully torn from the liquid droplet containing the waste material. These are ice particles are expected to be particularly clean of the undesired waste water materials. When this ice particle laden air is used to feed HVAC, the air is warmed so that the ice particles can be collected during the thaw. If the scale of the chamber is sufficiently large, this flow of accumulated thawed ice particles will generate pure water that can be collected for use as potable water.

In this counter flow heat exchange process the warm droplets of waste water will encounter the airflow that is at near the cold eutectic temperature of the wastewater. The droplets will initiate their freezing as the air exits near the top of the chamber. Near the middle height of the chamber, the −175° F. air is introduced into the chamber via an annulus duct around the chamber. At this height the droplet is designed to have attained its eutectic temperature and initiated its ice shell formation (FIG. 13*a*).

In reference to FIG. 13*a*, an embodiment of the spray chamber is shown along with a depiction of freezing process the wastewater undergoes. The spray chamber shown is configured with a rotating air flow and wall lining 26. The wall lining 26 is provided to prevent ice particles from sticking to the wall as they travel upward and outward with the air flow. The spray chamber shown is further configured with multiple spray nozzles and a removeable ice bucket 15.

In reference to FIG. 13*a*, the freezing process of wastewater is depicted as a droplet 31, having a specified sized is introduced to the top of the upward spiraling cold air stream. At 32 the droplet falls into colder air; eutectic freezing temperature is approached and pure water migrates to the surface of the droplet to be frozen outside-in. At 33 additional layers of pure water freeze and tighten around the liquid core, unsustainable tension occurs in the forming ice jacket. At 34, within milliseconds, the stressed ice jacket explosively fragments, releasing ice crystals that fly radially outward from the liquid core. At 35 occurring in the middle of the chamber 27, the purified ice fragments sweep upward into the spiraling cold air stream, while the heavier liquid core continues to fall to the bottom of the chamber.

The "eutectic freeze" or "freeze" crystallization spray chamber requires the use of an inexpensive source of continuous flow of a high mass flow of air at between −170° F. and −180° F. to freeze the liquid waste water droplets. There are two sources of high mass flow of super-chilled air: Turboexpander/Generator Set and Turboexpander loaded by a Turbocompressor (Compander). Companders are more generally available commercially when there is one-stage turboexpander. The two-stage Turboexpander/Generator Set is available from the larger manufacturers. The two-stage, free-spooling compander must be ordered with special specifications.

The additional sources of cold temperatures for the freeze crystallization spray chamber are as follows:

1. Two-Stage, Free-Spooling Compander provides the high air mass flows of approximately −180° F. to freeze wastewater droplets at room temperature to eutectic temperatures of the wastewater associated with −6° F.
2. One-Stage, Free-Spooling Compander provides the high air mass flows of approximately −120° F. to freeze wastewater droplets at colder than room temperature to eutectic temperatures of the wastewater associated with −6° F.
3. Natural cold temperatures slightly warmer than −6° F. supply the required environment to freeze the initial lower concentration waste water spray droplets when they fall to earth, to form a separate (1) Mass of porous, low-density, ice floating atop a high density, high concentrated brine solution associated with the eutectic concentration. This brine solution drains through the porous ice mass (see Gao Thesis) and buoys the porous ice mass. This represents the most economical technique for wastewater separation but requires long residence times.
4. Liquid nitrogen vaporization supplies the coldest freezing environment, namely, down to −320° F. This represents the most expensive technique and shortest residence time. This approach, of using a mixture of vaporized nitrogen mixed with room-temperature dry air, is suitable for laboratory studies especially in the range of −120° F. to −180° F.

The use of large wastewater droplets permits two important advantages: Formation of a brittle ice shell around the incompressible waste water at the eutectic temperature or slightly warmer than the eutectic temperature that fractures as a brittle material so that the fragments of the ice shell separate from the liquid explosively. Also, larger droplets using larger diameter spray nozzles permit the sprayer to process higher mass flows of wastewater in practical sized shower heads.

Droplets under 50 microns in diameter do not form brittle ice shells.

The use of 400 micron diameter droplets permits freezing of the droplet and the migration of fresh water from inside the droplet to the outside of the droplet and progressively form the thicker and thicker outer shell of porous, brittle ice as the droplet progressively freezes from the outside toward the center. The outside of the droplet is in contact with the cold air. It is preferable to have the droplet completely frozen in less than 1 second to assure short travel times and short travel distances of the droplet through the height of the vertical chamber.

Where chamber heights are not limited because of existing surrounding structures, consideration can be given to 1,500 micron diameter droplets to assure high mass flow processing of waste water and more efficient separation of the ice from the liquid core.

Note that the −6° F. is the eutectic freezing point for NaCl in fresh water. Other salts have different paired combinations of eutectic freezing temperature and eutectic salt concentration.

In reference to FIG. 13e, the flash freezing of different droplet sizes is predicted, according to an embodiment. When a droplet has a diameter of less than 50 microns 41, the ice shell remains attached to the droplet. When a droplet has a diameter greater than 50 microns but less than 400 microns 42, the ice shell shatters into fragments that move radially outward from the droplet. When a droplet has a diameter larger than 1000 microns, the ice shell shatters into smaller fragments, which move radially outward from the droplet.

Below the middle height of the chamber there is a length of chamber containing no air flow as the droplet continues its vertical fall. The bottom part of the chamber receives droplets that have thicker and thicker ice shells forming around the liquid core until the shells fracture and explosively flow outward from the liquid droplet. The dead volume is at the eutectic freeze crystallization temperature for the eutectic freeze crystallization process or at slightly warmer than the eutectic freeze crystallization temperature for the freeze crystallization process. The existing pilot plant sized chambers using bulk freezing operate at above the eutectic freeze crystallization chamber.

There are two main features of this configuration (FIGS. 9, 11 and 12): (1) Smaller height of chamber and (2) Longer residence time available during freezing. The smaller height permits applications wherein there are height limitations. The longer residence time permits treatment of more complex solutes. Furthermore, reduced height can be further reduced by using shorter heights and sacrificing available residence time.

FIG. 9 shows the overview of an updraft freeze crystallization chamber and a magnified view of the chamber as an inset drawing. FIG. 12 shows the details of the shipboard application. The shipboard application has the advantage of the heat exchange coils attached to the inside surface of the ship so that there is an infinite heat sink as well as no exposure of heat exchanger coils to salt water on the outside surface of the ship.

The main reason for the upward flow of the −175° F. air is to provide longer heat exchange time between the air and droplets. The addition of the swirling air provides an even longer heat exchange time between the air and droplets . . . in the same height spray chamber. The Freeze Crystallization Swirling Spray Chamber is shown in FIG. 13a.

All the small ice fragments will wander upward in a helix trajectory toward the exit at the top (FIG. 13b). FIG. 13c shows a sample calculation for 900 micron diameter droplet injection wherein Stokes Number <1 and Reynolds <1 assure that 7 micron equivalent diameter ice particles will not impact any falling droplets (FIG. 13d). The ice shell is thin and its fragments are expected to be small so some of the fragments will be small enough to follow the local air stream.

Some of the middle sized ice fragments will bounce around after multiple low velocity impacts with liquid droplets . . . but escape capture . . . and these surviving fragments will be thrown centrifugally toward and finally against the wall. The low density and ragged fragments (high drag coefficient) will be dragged upwards along the Teflon line wall toward the exit. All the large sized ice fragments will be scrubbed downward by attachment to each droplet and swept downward to the bottom.

The exit duct at the top will contain air at the eutectic temperature. The air will contain ice crystals of small and middle size. The air and mixture of ice crystals will flow toward an HVAC system wherein chilled air will be provided and the ice crystals will liquefy and be collected as fresh water that can be further used for HVAC and drinking water.

The chamber diameter has an annular region adjacent to the interior vertical wall so that the middle sized ice crystals, that have managed to bounce off droplets while on their upward and outward radial path, reach the wall. These ice particles move upward along the wall and do not attach to the wall. The wall has a thin Teflon lining so that there is no adherence to the wall.

The waste water droplet enters at the top of the chamber at, say, +70° F. The warm droplet falls through a rising and rotating air current. The droplet first encounters air exiting the chamber at the top of the chamber. At the first encounter the droplet is at +70° F. while the air is, say, −6° F. at the top of the chamber. The heat exchange starts. At the −175° F. air inlet to the chamber the droplet is now cooled to −6° F. The ice shell had formed and shattered as a brittle failure under tension and exploded into fragments. The droplet continues its fall into the dead air volume at the bottom of the chamber wherein it is at −6° F.

The bottom plate of the perforated basket is just slightly covered with the upper surface of the concentrated liquid waste water. Falling droplets containing ice crystals will deposit the ice crystals on top of the previously deposited ice crystals while the droplets add more liquid. The liquid pool at the bottom drains at a rate that permits the liquid level to remain just above the bottom of the perforated plate. The ice mass grows with each new flake. The ice mass assumes a porous structure that permits further draining of any liquids between and/or attached to each crystal as a thin film. The basket is periodically removed via a batch or continuous process.

The introduction of the input airflow at −175° F. at the bottom of the freeze crystallization spray chamber is configured so that the input airflow is tangential and at the outermost radius of the chamber. The exit airflow is at near the eutectic temperature of the waste water droplet and is configured so that the output air flow is tangential and at the outermost radius of the chamber. The input and output air flows impart a rotation to the airflow so that a tracer particle would show the helical air flow through the chamber. This helical airflow, when combined with the updraft airflow, results in a longer time for heat exchange between the input wastewater liquid droplets and the airflow.

The input spray nozzle is located at the top of the chamber in a dead air region above the swirling air flow so that the spray nozzle does not get clogged by input liquid that freeze in the nozzle.

The input diameter of the droplets is determined by the pressure difference across the orifice plate of the showerhead and the diameter of the orifice holes. The input diameter is also selected larger than 50 microns diameter. At smaller than 50 microns there is no ice shell formation to crack. At 1,000 microns diameter the droplets form an ice shell around the residue liquid in the frozen droplets, and the ice shell cracks. The shell fragments are explosively driven from the liquid contents (FIG. 13*e*).

The objective of the selection of droplet diameter is to have the liquid droplet, say of 900 microns in diameter, that still fall vertically downward in the upward air flow velocity. Thus, the updraft velocity is slower than the terminal velocity of the 900 microns diameter droplet. The size of the droplet and the speed of the airflow are in the Stokes Regime of laminar airflow.

Furthermore, the helical airflow speed at its greatest speed near the chamber outer wall is such that the 900 micron diameter droplet falls almost vertically downward.

The droplet starts its vertically downward decent at the top of the chamber and chills as it encounters, say, −6° F. air at the top where the airflow is exiting. It continues falling vertically downward toward the mid-height of the chamber where the incoming air is at −175° F. During this time the water droplet should have reached a temperature slightly warmer than −6° F. because of heat exchange. Al Hakim has demonstrated that this process requires only 1 to 2 seconds . . . well within the available 10s of seconds.

The height in the chamber is above the incoming air so that there is an updraft. At this height the shell of ice has completely enveloped the remaining liquid droplet and is squeezing the incompressible liquid. The ice shell reaches an internal tensile stress that causes the shell to fracture and fly outward radially away from the center of the droplet. By selecting, say 900 microns, the separation is only explosive in the immediate zone between the liquid and the ice so that the separation is clean. However, the ice particles are sufficiently small that local air speed drag controls their flight.

The small ice particles are swept into the upward helical air flow because of their small size and jagged shape whereas the dense heavy liquid droplets continue their way downward.

The input wastewater spray has about more than a 5 diameter separation between droplets. The helical airflow is at slow speed (laminar) so that the airflow sweeps upward, around and through the open volume in the array of droplets. The small ice fragments are swept into this upward, around and through the open volume. As long as the ice fragments are small and in a low velocity air flow they have a Stokes Number smaller than unity. These small ice fragments will flow between droplets. The result is that the ice fragments are swept up and out the top while the liquid droplets form a puddle at the bottom of the chamber and are drained.

The liquid droplet that encounters a larger ice fragment may momentarily attach to it the droplet's outer surface. But the residence time is sufficiently long so that the ice fragment makes its way upward to the exit and the droplets make their way downward to their exit.

The ice particles that are forced radially outward to the inner surface of the chamber strike a thin sheet of Teflon that lines the inner surface of the chamber so that the ice particle will stay imbedded in the upward helical trajectory airflow toward the exit duct at the top of the chamber.

The separation of ice and wastewater is efficient. But the density of the two phase mixture limits the overall quantity of wastewater input in a practical sized chamber cross section. This configuration applies when there is a long duration time period required for efficient separation of a specialty waste product.

Overall separation efficiency can be enhanced by supplying more mass flow of cold air than ideal, increasing the cross-sectional area so that an easier path for the small fragments to exit along the inner wall of the chamber with less interference from falling droplets, using droplets larger than say, 900 microns, reducing the space between droplets less than 5 diameters of the droplets and not spraying any particles into the chamber along the centerline of the chamber where there is no helical air flow.

The process provides a system for processing wastewater that generates: Pure water, Solid crystals generated from eutectic freezing of the wastewater, Eutectic concentration of liquid solution of the wastewater. The operation at temperatures slightly warmer than the eutectic temperature keeps the brine solution from separating into its contents.

Each has application in specific commercial applications. The mass flow of super-chilled air available from turboexpander technology supplies the required high air mass flow rates.

The high mass flow of super chilled air at −165° F. to −175° F. is available from three turboexpander sources: (1) Transportable Compressed Air Energy Storage (T-CAES) systems, 9,10; (2) Transfer Line Compressed Air Energy Storage (TL-CAES) systems 11,12,13,14,15,16; (3) Two-stage, free-spooling, companders.

The freezing of the wastewater droplets from outside inward, expulsion of pure water from the center of the droplet to form an ever increasing thickness when the droplet attains its eutectic freeze crystallization temperature and the explosive separation of the ice shell fragments away from the residual liquid droplet provides an efficient separation mechanism between liquid wastewater droplet (at the high concentration associated with the eutectic freeze crystallization temperature) and the pure ice flake.

Separation efficiency of the spray system is expected to be high because of the high magnitude of the separation forces, especially for larger than 1 mm (1,000 microns) diameter droplets.

The eutectic diagram and eutectic tests of the wastewater solution will not only show the temperatures of importance to the phase diagram but also the size of the crystals in the dense layer at the bottom of the brine. When the size of the ice flakes are revealed in the preliminary chamber tests and the ice flake sizes are comparable in size to the crystal sizes, it is necessary to keep the crystals in solution while the ice flakes are trapped on the top surface of the perforated plate (FIG. 14*a*). Thus, the heat exchange between falling particle and air results in a particle temperature warmer than the eutectic temperature . . . even though the local air may be much colder than the eutectic temperature. An example set of temperatures are shown at the exit air ducts (−20° F.) while the cloud of ice flakes and liquid droplet are each at −4° F. The dead volume with stagnant air fills with particles and liquids at −4° F. so that the stagnant air temperature is kept at −4° F. This temperature is maintained at a temperature slightly warmer than the eutectic temperature of −6° F.

When the size of the ice flakes are revealed in the preliminary chamber tests and the ice flake sizes are much larger in size to the crystal sizes, it is not necessary to keep the crystals in solution while the ice flakes are trapped on the top surface of the perforated plate (FIG. 14b). Thus, the heat exchange between falling particle and air results in a particle temperature equal to the eutectic temperature . . . even though the local air may be much colder than the eutectic temperature. An example set of temperatures are shown at the exit air ducts (−20° F.) while the cloud of ice flakes and liquid droplet are each at −6° F. The dead volume with stagnant air fills with particles and liquids at −6° F. so that the stagnant air temperature is kept at −6° F. This temperature is maintained at a temperature equal to the eutectic temperature of −6° F. The series of a coarse perforation plate and a fine perforation plate permits the separation of the frozen fresh water (ice fragments), concentrated liquid brine and the dense mineral particles. These three separate materials are removed for commercial applications.

For a range or eutectic temperatures and droplet sizes the separation of the ice flakes can be enhanced during their chamber trajectory by introducing a swirl favoring the low density, larger size and large surface area ice flake separation from the remaining smaller diameter liquid droplet. In the case of the downdraft chamber, the ice flakes will deposit in a mass at the periphery of the chamber while the droplets deposit in an annulus closer to the centerline. In the case of the updraft chamber, the ice flakes can be lofted upward and out with the exiting air flow.

The ice flakes form a mound of ice with observed density of between 0.5 to 0.6 gm/cc (compared to liquid water at 1.0 gm/cc) so that the flakes float rapidly to the top of the high density liquid formed by the liquid droplets.

The use of large wastewater droplets >>50 microns in diameter provides assurance that the explosive separation process between the ice shell and core liquid at the outset of the separation process, but also supplies larger ice flakes in the mound at the bottom of the chamber to provide a more porous structure for drainage through this low packing-factor porous structure.

The larger initial diameter sprays also provide larger ice flakes so there is a smaller surface area to volume ratio so that less drainage is required for a higher water purity result.

The larger droplet diameter permits larger nozzle orifice areas to avoid clogging of the nozzles by the filtered input wastewater. There is reduced friction loss so that lower hydraulic pressures are used. The larger diameter droplets permit processing larger wastewater flows through a given sized sprinkler head with its multitude of orifices.

The downdraft chambers are inexpensive to build, operate and maintain. They are sufficiently lightweight and easily separated into its piece parts so that it is portable. The outdoor applications allow 50 feet and higher heights of the heat transfer active portion of chamber.

The updraft chambers have the same useful properties as the downdraft chambers, except that the height requirement for the chamber is reduced to allow indoor applications. The longer residence times in this chamber also allow for more complex solutes to be removed.

The separate mass of ice flakes (solids) and the separate accumulation of liquid droplets, each at low temperatures, provide sources for HVAC and cold storage facilities. Also, the output air from the chamber can not only be used for HVAC and cold storage but input to Gen-Sets to obtain enhanced electrical power output.

The commercial turboexpander systems (high mass flow of air at about −175° F.) combined with these spray chambers (1 or 2 seconds of time for freezing and explosive separation of ice from droplet) are advantageous compared to the expense of huge vats of wastewater involving hour-long chilled down times and conventional refrigeration with its limited range of achievable low temperatures.

The deposited and drained ice flakes in the porous basket can be sent to the nearby storage room via a batch or continuous process. The eutectic air temperature is maintained at the bottom of the chamber, along the conveyor system and in the storage room. Drainage is monitored at all stages to evaluate the purity of the ice output.

If the requirement for higher purity is demanded, then washing is introduced at the bottom of the chamber and also in the storage room. The washing fluid is purified water obtained from downstream in the process and recirculated back. This recirculated water is already at low temperature close to the eutectic temperature, so that when sprayed onto the ice mass with residue of solute(s), the sprayed water freezing onto the pile will force the very thin film on each snow flake to be replaced by the incoming fresh water.

Washing the mound of porous snowflakes, wherein surfaces are coated by a concentrated liquid wastewater, enhances water purification after the snowflakes are thawed. Some of the purified water generated by the eutectic freeze crystallization process is recirculated back in order to spray the mound of porous snowflakes. The spray water is close to the freezing point of water. When the liquid spray strikes the mound it freezes on and into the mound thereby releasing more of the liquid impurities to be released from the mound and drained. FIG. 15 shows the analysis of the resulting mound of thawed ice flakes after one-, two- and three-washes. Four different solutes were analyzed.

Introduce of the input airflow at −175° F. at near the bottom of the freeze crystallization spray chamber is configured so that the input airflow is tangential and at the outermost radius of the chamber. The exit airflow is at near the eutectic temperature of the waste water droplet and is configured so that the output air flow is tangential and at the outermost radius of the chamber. The input and output air flows impart a rotation to the airflow so that a tracer particle would show the helical air flow through the chamber. This helical airflow, when combined with the updraft airflow, results in a longer time for heat exchange between the input wastewater liquid droplets and the airflow. This is the updraft freeze crystallization spray chamber with helical updraft air flow.

Overall separation efficiency of the updraft freeze crystallization spray chamber with helical updraft air flow can be enhanced by supplying more mass flow of cold air than ideal, increasing the cross-sectional area so that an easier path for the small fragments to exit along the inner wall of the chamber with less interference from falling droplets, using droplets larger than say, 900 microns, reducing the space between droplets less than 5 diameters of the droplets and not spraying any particles into the chamber along the centerline of the chamber where there is no helical air flow.

The two updraft versions of the freeze crystallization spray chambers result in a smaller height requirement for the chamber. This permits indoor applications such as shipboard applications where height is limited.

The sources of cold temperatures for the freeze crystallization spray chamber are as follows: Two-Stage, Free-Spooling Compander provides the high air mass flows of approximately −180° F. to freeze wastewater droplets at room temperature to eutectic temperatures of the wastewater associated with −6° F. One-Stage, Free-Spooling Compander provides the high air mass flows of approximately −120° F. to freeze wastewater droplets at colder than room temperature to eutectic temperatures of the wastewater associated with −6° F.

Natural cold temperatures colder than −6° F. supply the required environment to freeze the initial lower concentration waste water spray droplets when they fall to earth, to form a separate (1) Mass of porous, low-density, ice floating atop a high density, high concentrated brine solution associated with the eutectic concentration. This brine solution drains through the porous ice mass (see Gao Thesis) and buoys the porous ice mass. This represents the most economical technique for wastewater separation but requires long residence times.

Liquid nitrogen vaporization supplies the coldest freezing environment, namely, down to −320° F. This represents the most expensive technique and shortest residence time. This approach, of using a mixture of vaporized nitrogen mixed with room-temperature dry air, is suitable for laboratory studies especially in the range of −120° F. to −180° F.

The use of large wastewater droplets permits two important advantages: Formation of a brittle ice shell around the incompressible waste water at the eutectic temperature that fractures as a brittle material so that the fragments of the ice shell separate from the liquid explosively. Also, larger droplets using larger diameter spray nozzles permit the sprayer to process high mass flows of wastewater in practical sized shower heads. Droplets under 50 microns in diameter do not form brittle ice shells.

The use of 400-micron diameter droplets permits freezing of the droplet and the migration of fresh water from inside the droplet to the outside of the droplet and progressively form the thicker and thicker outer shell of porous, brittle ice as the droplet progressively freezes from the outside toward the center. The outside of the droplet is in contact with the cold air. It is preferable to have the droplet completely frozen in less than 1 second to assure short travel times and short travel distances of the droplet through the length of the chamber.

Where chamber heights are not limited because of existing surrounding structures, consideration can be given to 1,500 micron diameter droplets to assure high mass flow processing of waste water and more efficient separation of the ice from the liquid core. In such instances, the greater size potentially allows for a more effective process, making a 1,500 micron diameter droplet desirable, and potentially a preferable droplet size.

Note that the −6° F. is the eutectic freezing point for NaCl in fresh water. Other salts have different paired combinations of eutectic freezing temperature and eutectic salt concentration.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A wastewater purification system comprising:

a. a chamber having a top and a bottom;

b. one or more wastewater nozzles positioned near the top of the chamber;

c. an intake duct to supply chilled air into the chamber;

d. one or more exhaust ducts to remove the chilled air from the chamber;

e. one or more perforated receptacles positioned near the bottom of the chamber to collect solid byproducts;

f. a watertight receptacle at the bottom of the chamber to collect a liquid product;

wherein wastewater enters the chamber as wastewater droplets via the one or more wastewater nozzles, and wherein the wastewater undergoes freeze separation due to heat exchange with a high mass flow of the chilled air between the intake duct and the one or more exhaust ducts;

wherein the chilled air is sourced from one or more systems selected from the group consisting of: a transportable compressed air energy storage system, a transfer line compressed air energy storage system, a one-stage free spooling compander system, a two-stage free-spooling compander system, liquid nitrogen system, a climate wherein chilled air is available, or any combination thereof;

wherein the chilled air enters the chamber at approximately −175 degrees Fahrenheit and is exhausted from the chamber at approximately −25 degrees Fahrenheit;

wherein the one or more exhaust ducts exhaust the chilled air to a centrifuge to remove ice particles, and wherein the centrifuge exhausts ice-free chilled air to a gas turbine generator set, and wherein the ice-free chilled air provides the gas turbine generator with an electrical output increase of approximately 30 percent.

2. The system of claim 1, wherein the solid byproduct is purified ice and the liquid byproduct is a brine solution.

3. The system of claim 1, wherein the one or more wastewater nozzles are configured to emit waste water droplets having a diameter of 400-1500 microns.

4. The system of claim 1, wherein the intake duct is positioned above the one or more exhaust ducts to create a downdraft chilled air mass flow.

5. The system of claim 4, wherein the chamber is substantially cylindrical.

6. The system of claim 5, wherein the chamber has a height of 50 feet and diameter of 10 feet.

7. The system of claim 4, wherein the chamber is substantially shaped as a rectangular box.

8. The system of claim 7, wherein the chamber has a height of 50 feet and a square cross-section of 10 feet by 10 feet.

9. The system of claim 1, wherein the intake duct is positioned below the one or more exhaust ducts to create an updraft chilled air mass flow.

10. The system of claim 9, wherein the chamber is substantially cylindrical, and wherein the chamber is approximately 20 feet in height and 8 feet in diameter.

11. The system of claim 9, wherein the chamber is substantially shaped as a rectangular box having a height of approximately 20 feet and a square cross-section of approximately 8 feet by 8 feet.

12. The system of claim 9, wherein the intake duct and the exhaust duct are configured to supply the chilled air with a helical rotating mass air flow pattern.

13. The system of claim 4, wherein one or more water nozzles are positioned above the perforated receptacle to emit water onto and wash the solid byproduct.

14. The system of claim 1, wherein the water tight receptacle is further provided with a drain to remove the liquid product.

15. The system of claim 1, wherein at least one of the one or more exhaust ducts supplies chilled air to an HVAC system, and wherein an intake chamber of the HVAC system is configured to collect potable water by thawing small ice particles from the supplied chilled air.

16. A wastewater purification system comprising:
   a. a chamber having a top and a bottom;
   b. one or more wastewater nozzles positioned near the top of the chamber;
   c. an intake duct to supply chilled air into the chamber;
   d. one or more exhaust ducts to remove the chilled air from the chamber;
   e. an upper perforated plate positioned near the bottom of the chamber to collect pure water snowflakes;
   f. a lower perforated plate positioned below the upper perforated plate to collect mineral crystals;
   g. a watertight receptacle at the bottom of the chamber to collect a liquid product;

wherein wastewater enters the chamber as wastewater droplets via the one or more wastewater nozzles, and wherein the wastewater undergoes eutectic freeze separation due to heat exchange with a high mass flow of the chilled air between the intake duct and the one or more exhaust ducts;

wherein the chilled air is sourced from one or more systems selected from the group consisting of: a transportable compressed air energy storage system, a transfer line compressed air energy storage system, a one-stage free spooling compander system, a two-stage free-spooling compander system, liquid nitrogen system, a climate wherein chilled air is available, or any combination thereof;

wherein the chilled air enters the chamber at approximately −175 degrees Fahrenheit and is exhausted from the chamber at approximately −25 degrees Fahrenheit;

wherein the one or more exhaust ducts exhaust the chilled air to a centrifuge to remove ice particles, and wherein the centrifuge exhausts ice-free chilled air to a gas turbine generator set, and wherein the ice-free chilled air provides the gas turbine generator with an electrical output increase of approximately 30 percent.

17. The system of claim 16, wherein the liquid product is brine.

* * * * *